(12) United States Patent
Castillo et al.

(10) Patent No.: US 12,182,936 B2
(45) Date of Patent: Dec. 31, 2024

(54) SYSTEMS AND METHODS FOR PITCH DETERMINATION

(71) Applicant: Hover Inc., San Francisco, CA (US)

(72) Inventors: William Castillo, Belmont, CA (US); Giridhar Murali, San Francisco, CA (US); Brandon Scott, New York, NY (US); Kai Jia, San Francisco, CA (US); Jeffrey Sommers, Mountain View, CA (US); Dario Rethage, Kendall Park, NJ (US)

(73) Assignee: Hover Inc., San Francisco, CA (US)

( * ) Notice: Subject to any disclaimer, the term of this patent is extended or adjusted under 35 U.S.C. 154(b) by 0 days.

(21) Appl. No.: 18/505,997

(22) Filed: Nov. 9, 2023

(65) Prior Publication Data

US 2024/0161397 A1 May 16, 2024

Related U.S. Application Data

(62) Division of application No. 17/445,939, filed on Aug. 25, 2021, now Pat. No. 11,847,739.

(Continued)

(51) Int. Cl.
*G06T 17/00* (2006.01)
*G06N 3/08* (2023.01)
(Continued)

(52) U.S. Cl.
CPC ............... *G06T 17/00* (2013.01); *G06N 3/08* (2013.01); *G06T 7/10* (2017.01); *G06T 7/70* (2017.01);
(Continued)

(58) Field of Classification Search
CPC .. G06N 3/08; G06T 17/00; G06T 7/10; G06T 7/70; G06T 2207/20084; G06T 2207/20092
See application file for complete search history.

(56) References Cited

U.S. PATENT DOCUMENTS 8,422,825 B1 4/2013 Neophytou et al.
8,610,708 B2 12/2013 Richards
(Continued)

FOREIGN PATENT DOCUMENTS

WO WO 2021/041719 A1 3/2021

OTHER PUBLICATIONS

Kushal, et al., Single View Reconstruction of Piecewise Swept Surfaces, International Conference on 3D Vision, 8 pages, Jun. 29, 2013.
(Continued)

*Primary Examiner* — Xilin Guo
(74) *Attorney, Agent, or Firm* — Knobbe, Martens, Olson & Bear, LLP

(57) ABSTRACT

Systems and methods are provided for pitch determination. An example method includes obtaining an image depicting a structure, the image being captured via a user device positioned proximate to the structure. The image is segmented to identify, at least, a roof facet of the structure. An eave vector and a rake vector which are associated with the roof facet are determined. A normal vector of the roof facet is calculated based on the eave vector and the rake vector, and compared to a vector indicating a vertical direction such as gravity. The angle made out by the normal and a gravity vector may be utilized to calculate the pitch of the roof facet.

31 Claims, 20 Drawing Sheets

Related U.S. Application Data

(60) Provisional application No. 63/070,816, filed on Aug. 26, 2020.

(51) Int. Cl.
  *G06T 7/10* (2017.01)
  *G06T 7/70* (2017.01)

(52) U.S. Cl.
  CPC ............ *G06T 2207/20084* (2013.01); *G06T 2207/20092* (2013.01)

(56) References Cited

U.S. PATENT DOCUMENTS

| | | |
|---|---|---|
| 9,437,033 B2 | 9/2016 | Sun et al. |
| 11,004,259 B2 | 5/2021 | Hu et al. |
| 2016/0284075 A1 | 9/2016 | Phan et al. |
| 2019/0080467 A1* | 3/2019 | Hirzer ................ G06T 7/73 |
| 2019/0088032 A1* | 3/2019 | Milbert ............... G06F 3/04815 |
| 2019/0279420 A1* | 9/2019 | Moreno ................ G06T 17/10 |
| 2019/0371057 A1* | 12/2019 | Upendran ............. G06T 17/00 |
| 2019/0385363 A1* | 12/2019 | Porter .................. G06V 10/44 |
| 2020/0057824 A1* | 2/2020 | Yeh ..................... G06F 30/13 |
| 2021/0279811 A1* | 9/2021 | Waltman ............... H04N 23/80 |
| 2023/0215087 A1 | 7/2023 | Castillo et al. |

OTHER PUBLICATIONS

U.S. Appl. No. 62/893,100, filed Aug. 28, 2019, Jia et al.
U.S. Appl. No. 62/983,324, filed Feb. 28, 2020, Shree.
U.S. Appl. No. 63/140,716, filed Jan. 22, 2021, Rethage et al.
Wang et al., "Designing Deep Networks for Surface Normal Estimation," Proceedings of the IEEE Conference on Computer Vision and Pattern Recognition (CVPR), 2015, pp. 539-547.

* cited by examiner

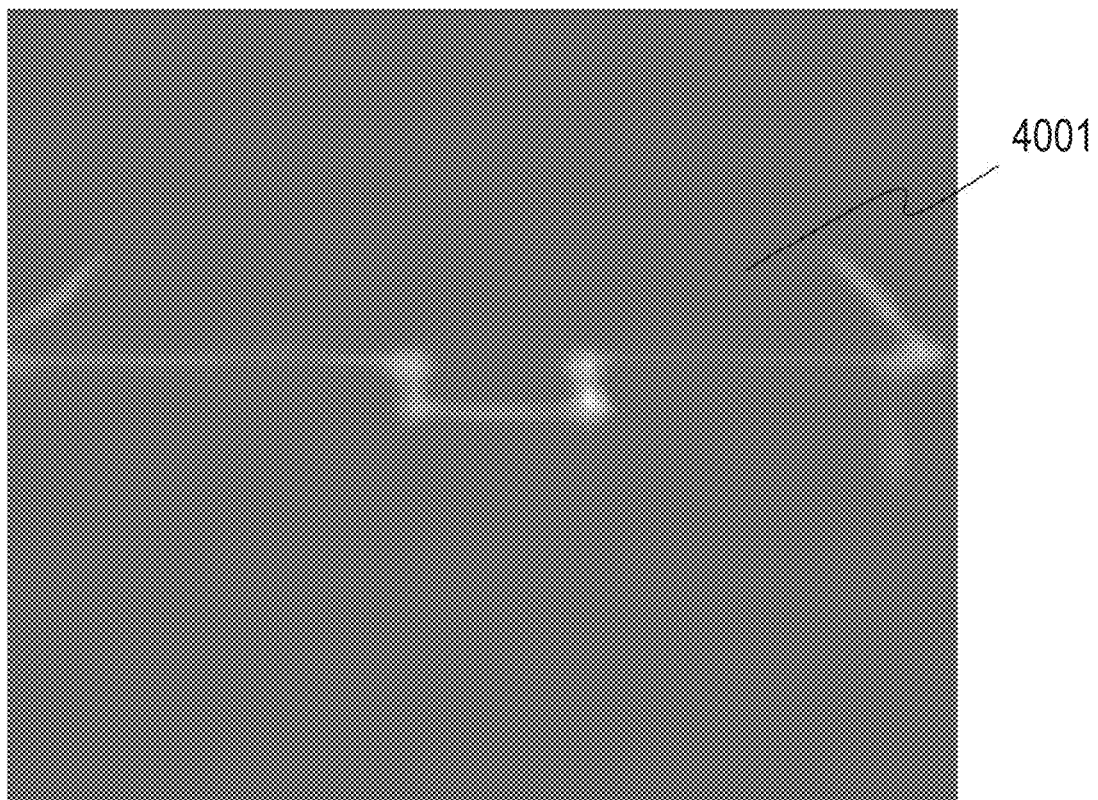
FIG. 4D

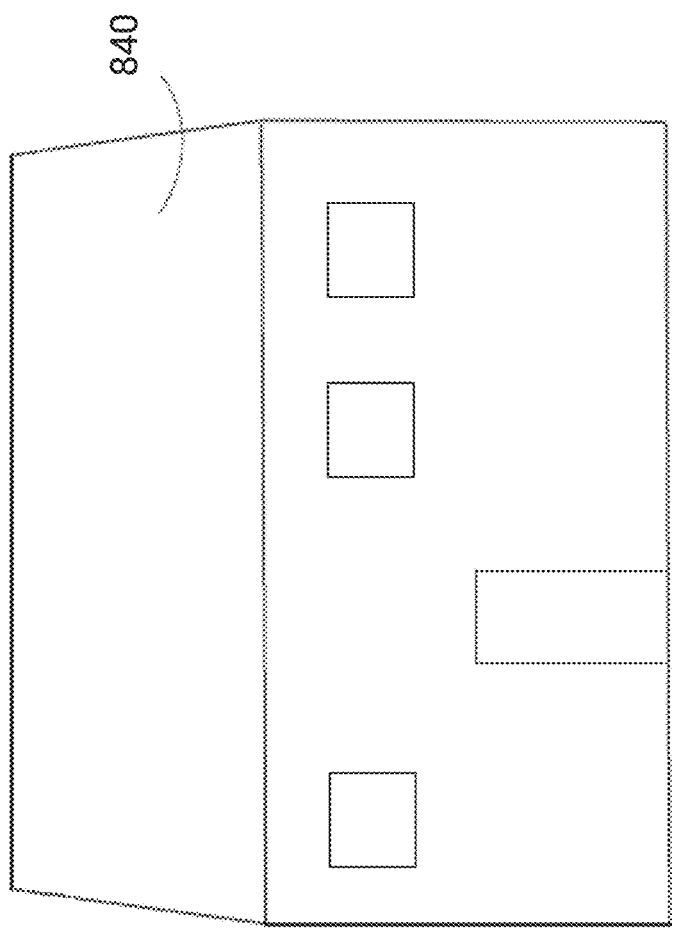

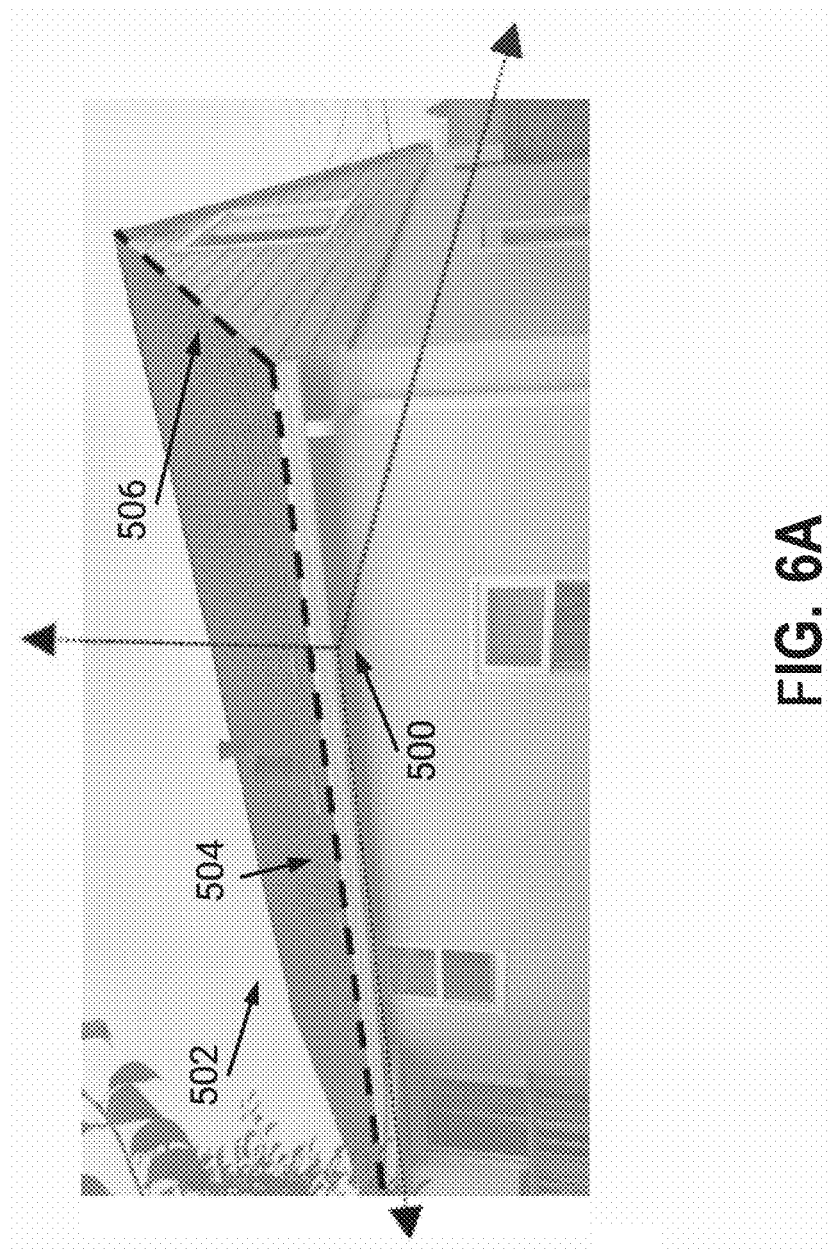

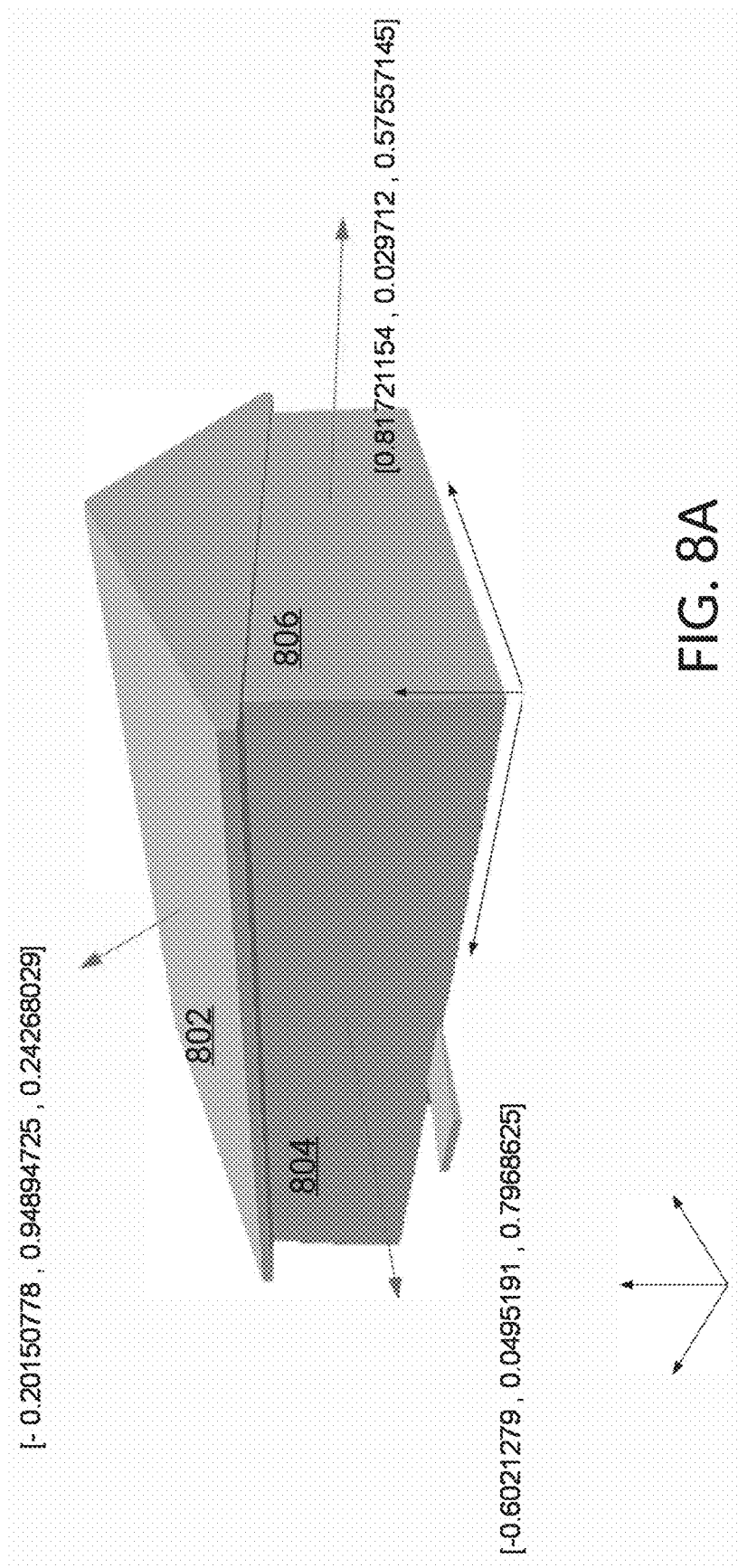

SYSTEMS AND METHODS FOR PITCH DETERMINATION

PRIORITY CLAIM

This application claims priority to, and is the continuation a divisional of, U.S. patent application Ser. No. 17/445,939, filed on Aug. 25, 2021, entitled "SYSTEMS AND METHODS FOR AUTOMATED PITCH DETERMINATION", which claims the priority benefit of U.S. Provisional Patent Application No. 63/070,816, filed on Aug. 26, 2020, entitled "SYSTEMS AND METHODS FOR AUTOMATED PITCH DETERMINATION", the entirety of which is incorporated herein by reference.

CROSS-REFERENCE TO RELATED APPLICATIONS

This application is related to and incorporates by reference the contents of the following applications in their entirety, each of the following is co-owned by the Applicant:
U.S. patent application Ser. No. 12/265,656, now U.S. Pat. No. 8,422,825;
U.S. patent application Ser. No. 14/339,127, now U.S. Pat. No. 9,437,033;
U.S. patent application Ser. No. 15/025,132, now U.S. Pat. No. 11,004,259;
U.S. Provisional Patent Application 62/893,100;
International Application No. PCT/US2020/048263;
U.S. Provisional Patent Application 62/983,324; and
U.S. Provisional Patent Application 63/140,716.

TECHNICAL FIELD

The present invention relates to image analysis, and more specifically, to extraction of the pitch or slope of the planar surface of a structure, such as a roof facet, and generating geometric representations of boundaries of a feature disposed on that planar surface.

BACKGROUND

Three-dimensional models of a building may be generated based on two-dimensional digital images taken of the building. The digital images may be taken via aerial imagery, specialized-camera equipped vehicles, or by a user with a camera from a ground-level perspective (such as by a smart phone) when the images meet certain conditions. The three-dimensional building model is a digital representation of the physical, real-world building. An accurate three-dimensional model may be used to derive various building measurements or to estimate design and renovation costs.

However, generating an accurate three-dimensional model of a building from two-dimensional images that are useful for deriving building measurements or estimating design and renovation costs can require significant time and resources and special visual tools overlaid on an image for a user to manipulate.

SUMMARY OF CERTAIN EMBODIMENTS

In some embodiments, a method is provided for implementation by a system of one or more computers. The method comprises obtaining an image depicting a structure, the image being captured via a user device positioned proximate to the structure. The image is segmented to identify, at least, an eave vector and a rake vector which are associated with a roof facet of the structure. A normal vector of the roof facet is calculated based on the eave vector and the rake vector. In some embodiments, a system is provided comprising one or more processors and non-transitory computer-readable media storing instructions which, when executed by the one or more processors, cause the one or more processors to perform the method.

In some other embodiments, a method is provided for implementation by a system of one or more computers. The method comprises obtaining an image depicting a structure, the image being captured via a user device positioned proximate to the structure. The image is provided as an input to a neural network, wherein a forward pass through the neural network is computed, and wherein the neural network outputs, at least, a surface normal associated with a roof facet depicted in the image. The neural network is trained to output a surface normal associated with a planar elements of the structure. In some embodiments, a system is provided comprising one or more processors and non-transitory computer-readable media storing instructions which, when executed by the one or more processors, cause the one or more processors to perform the method.

In yet other embodiments, a method is provided for implementation by a system of one or more computers. The method comprises obtaining a plurality of images depicting a structure, the images being captured via one or more user devices positioned proximate to the structure. Based on the images, a point cloud associated with the structure is generated, the point cloud including points which are assigned respective depths. A subset of the points included in the point cloud is selected, the subset being associated with a roof facet of the structure. A surface normal for the roof facet is determined based on the subset of points. In some embodiments, a system is provided comprising one or more processors and non-transitory computer-readable media storing instructions which, when executed by the one or more processors, cause the one or more processors to perform the method.

It will be appreciated that although the figures and description below make specific references to particular aspects displayed within a figure, the techniques disclosed herein preferably run automatically and with no visual cues, to a user or otherwise. The displayed content of the figures occur in an image processing pipeline, and the figures display activities at those stages of the pipeline for ease of explanation.

The systems, methods, and devices of this disclosure each have several innovative aspects, no single one of which is solely responsible for all of the desirable attributes described herein.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between elements. The drawings are provided to illustrate embodiments of the subject matter described herein and not to limit the scope thereof.

FIGS. 4A-4G illustrate examples of images segmentation using segmentation masks specific for one or more sub-feature classifications.

FIG. 5 illustrates roof pitch effects on image area determinations.

FIG. 6A illustrates a vanishing point coordinate system for a structure and isolating segmented roof lines according to some embodiments.

FIG. 8A illustrates surface normal output based on surface color value prediction according to some embodiments.

Like reference numbers and designations in the various drawings indicate like elements.

DETAILED DESCRIPTION

Figure 1A:
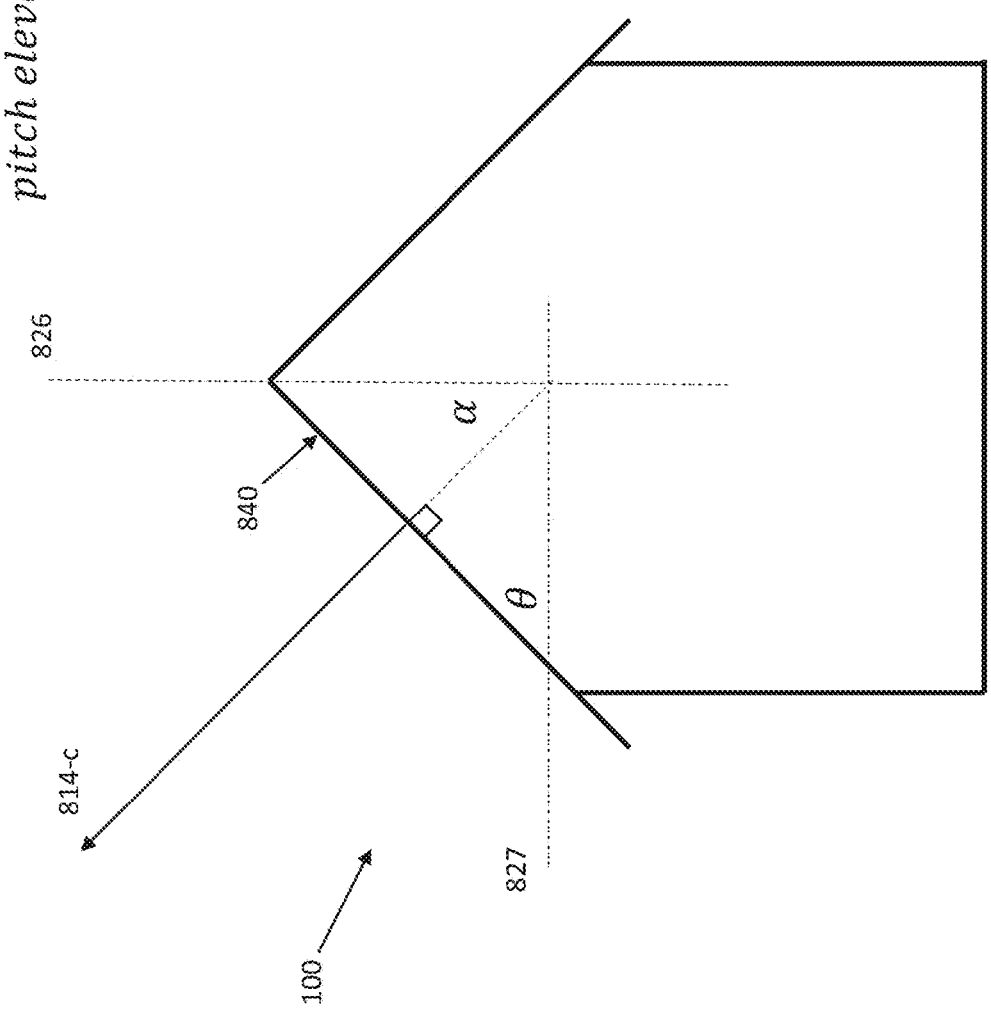
FIG. 1A illustrates an example calculation of the pitch of a roof utilizing a surface normal.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

This application describes, among other things, technical advantages associated with determining the pitch of a roof facet of a structure. As will be described, pitch may be determined based on one or more images of a structure taken via a user device (e.g., an unmanned aerial vehicle (UAV or "drone"), a smart phone, tablet, camera, and so on). These images may be analyzed to extract features of the structure, which may then be analyzed to determine the pitch.

Prior techniques to determine pitch relied upon specialized tools and interfaces for users to manipulate. For example, a user may manually identify features of a structure in an image which are usable to determine a pitch. Example features, as may be appreciated, may include lines, corners, portions of the structure, center points, and so on. In this example, the user may add markup, labels, and other data to images to indicate feature locations and/or details regarding the features.

However, such manual identification may be time consuming and prone to error. For example, a user may incorrectly label a feature, incorrectly markup a location, shape, and/or boundary of a feature. As another example, the user may mistakenly fail to label or markup a feature in an image. Additionally, the user's use of interface tools may be prone to error due to imprecise placement of the features. For example, the user may lack a fine-grained ability to precisely mark a boundary associated with a feature. Thus, the inaccurate boundary may propagate downwards causing an incorrect determination of the structure's elements, such as measurements or roof pitch.

In this way, such manual techniques may be time consuming and lead to inaccuracies in determining pitch. Automated techniques which use analyses of images of the structure may improve upon these manual techniques.

Image source is also relevant. For example, unmanned aerial vehicles (UAV) may obtain images (e.g., aerial images) of a multitude of structures positioned below the UAV. In this example, the obtained images may represent a top-view or oblique view of the structures. Aerial imagery is prone to reduced capacity to determine depth when the imager, which may include a camera, is directly above a target structure; where the structure has a roof, the roof's geometry appears flat and every pixel appears to have a similar distance from the camera. The limited perspective precludes analyzing depth changes in the roof and makes the roof pitch's basic calculation of rise-over-run more difficult to obtain as measuring the "rise" is more difficult. While a user may then overlay visual tools on portions of the structures which are associated with a roof, and indications of pitches may be determined, the user is at the mercy of the quality of the image. Additionally, use of such top-view images may be prone to error due to an inaccurate level of detail with respect to the features usable to determine pitch. For example, a top-view image may lack inclusion of the structure's visual appearance from a ground height to a top of the structure. In this example, the top-view image may lack a front of the structure as would be seen from ground-level (e.g., the top-view image may lack a depiction of a gable), or the distance from the imager to the structure results in low resolution imagery wherein a particular feature cannot be accurately located.

In contrast, various embodiments disclosed herein advantageously provide not only automated techniques, but in some embodiments leverages ground-level imagery. For example, a user may hold the user device and obtain images of the structure. In this example, the obtained images may thus include detailed depictions of the visual appearance of the structure from substantially ground level to an upper extremity of the structure. For example, the obtained images may be usable to accurately determine a more precise coordinate system defined as least by an axis associated with elevation or gravity (herein referred to as a 'gravity vector'). As another example, the obtained images may be usable to accurately determine a surface normal vector to a roof facet of the structure. Through comparing the gravity vector and the surface normal, an accurate extraction of pitch may be effectuated: a particular roof facet's pitch is equal to the angle formed by its surface normal and the gravity vector.

This application therefore describes example advantages over prior techniques to determine pitch. As described above, the application may use automated techniques to reduce error associated with user usage of interfaces. Furthermore, in some embodiments, due to the usage of a substantially ground-level image, the pitch of a roof may be more accurately extracted. Thus, the application improves upon prior digital techniques to determine pitch and addresses technological problems with these prior techniques.

For example, this specification describes, among other things, techniques to extract pitch for a planar surface, such as a roof facet, preferably without visual overlays, visual cues or other user tools for aiding the image analysis. Pitch may be extracted based on one or more images of a structure which are obtained via a user device while positioned proximate to the structure. For example, the user device may be a smart phone, tablet, wearable device, camera, and so on. A user of the user device may traverse an exterior of the structure and obtain one or more images. As may be appreciated, these images may be obtained at substantially ground-level (e.g., a threshold distance above the ground based on a height of the user's hands). As another example, the user device may be an automated vehicle (e.g., an unmanned aerial vehicle, an unmanned ground vehicle). In some examples, the automated vehicle may traverse the exterior of the structure and obtain one or more images of the structure at a height similar to that of the user or below the height of the structure. In some embodiments, the obtained images may further include aerial photos, satellite photos, and so on.

As used herein, the term "structure" refers to any three-dimensional object, man-made or natural. Structures may include, for example, houses, offices, warehouses, factories, and other buildings; arenas, stadiums, monuments, storage tanks, and other non-building constructs; fences, walls, bridges, roads, and other infrastructure; etc.

As will be described, to extract pitch of a roof facet, a system or user device may determine a surface normal to the roof facet. The surface normal may represent a normal vector to the roof facet. Additionally, the system or user device may determine a substantially vertical portion of the structure, or a portion of an image corresponding to a vertical portion. As described herein, the substantially vertical portion may be referred to as a gravity vector (e.g., a vector pointing substantially vertically downwards towards the ground). An example substantially vertical portion may also include a boundary of a portion of the structure which is substantially vertical (e.g., an edge of a façade of a house).

In some embodiments, a vanishing point coordinate system may be used to identify the gravity vector (e.g., the y-axis of the system). For example, the vanishing point coordinate system may be determined via extending lines associated with a structure to determine intersections. As an example, a first line following an upper portion of a wall may be extended in a horizontal direction in combination with a second line following a lower portion of the wall. As another example, a third line following a left portion of the wall may be extended in a vertical direction in combination with a fourth line following a right portion of the wall. Locations where the first and second lines intersect, and the third and fourth lines intersect, may be used to determine a coordinate system (referred to herein as a vanishing point coordinate system).

In some embodiments, the gravity vector may represent a purely vertical vector (e.g., [0,1,0]) for a unit vector where they axis is the vertical axis. Thus, the relationship of the surface normal to the gravity vector may be used to determine the particular facet's pitch. In some embodiments, the gravity vector may be determined by the user device taking an image of a structure. For example, the gravity vector may be provided in a particular format (e.g., .json format). In this example, the user device may use an augmented reality camera platform to determine the gravity vector. The user device may optionally utilize an inertial measurement unit (IMU) to determine the gravity vector.

Via comparing the surface normal and gravity vector, the system or user device may extract the pitch of the roof facet. For example, the system or user device may derive an angle between the two vectors. The pitch may then be determined based on this derived angle, which in some embodiments may be adjusted by a constant angle (e.g., 90 degrees). FIG. 1A illustrates an example calculation using the derived angle to determine the amount of elevation (in inches) for twelve inches of roof run; thereby producing a pitch value. FIG. 1A illustrates cross section of a house structure 100 with a simple roof of two symmetrical facets 840. Angle α is formed by the facet's surface normal 814-*c* and gravity vector 826. As shown in the FIG. 1A, the angle θ is equal to the angle α. This angle α may then be used as the angle of the roof (θ) as compared to a horizontal plane 827, from which the rate of the roof facet's elevation change may by calculated to generate a pitch value. It will be appreciated that the value tan(θ) provides a unitless rise/run value and the multiplication factor 12 (corresponding to 12 inches) provides the rise in inches for every 12 inches of run.

In some embodiments, based on the pitch, additional vertical vanishing points of a structure may be derived according to the pitch angle, thus providing a modified vertical vanishing point for features on the applicable roof facet for boundary enhancement, such as discussed in U.S. Provisional Patent Application 62/893,100 which is incorporated by reference herein in its entirety. Such features, which may include solar panels, skylights, and the like, have a subjective vertical vanishing point, since a "vertical" direction on such features aligns to the facet's pitch and not to the gravity vector of the structure or image otherwise.

To determine the surface normal, this application describes example techniques. As may be appreciated, these techniques may be combined in some embodiments and may not represent an exhaustive list of such techniques. Thus, additional techniques may be utilized and fall within the scope of the disclosure herein.

FIGS. 1B-7 describe techniques which analyze one or more images of a structure to determine specific vectors or lines associated with the structure. As an example, an image may be analyzed to extract horizontal vectors or lines associated with the roof of the structure, such as an eave. Additional horizontal lines associated with the structure may also be used, such as window lines, door lines, ridge lines and the like. This disclosure will refer to any such line as an eave vector. The eave vector, in some embodiments, may be substantially horizontal and parallel to a ground surface or orthogonal to a gravity vector. The image may additionally be analyzed to extract a line or vector associated with elevation changes in a roof facet, such as hips, valleys, or rakes (each herein referred to as a rake vector). An example of the rake vector is illustrated in FIG. 6A with respect to element 506.

Using the eave vector and rake vector, a system or user device may determine the surface normal. For example, in some embodiments the system or user device may use eave vectors and rake vectors that meet at right angles, and determine a cross-product of the eave vector and rake vector. In some embodiments, angular orientations in a 2D image may be transformed to generate an orthogonal characterization for those vectors, and the cross product subject to that transformation's inverse to determine the surface normal orientation according to that 2D image. As described above, via comparing the surface normal with a gravity vector the system or user device may extract pitch for the roof facet.

Figure 8B:
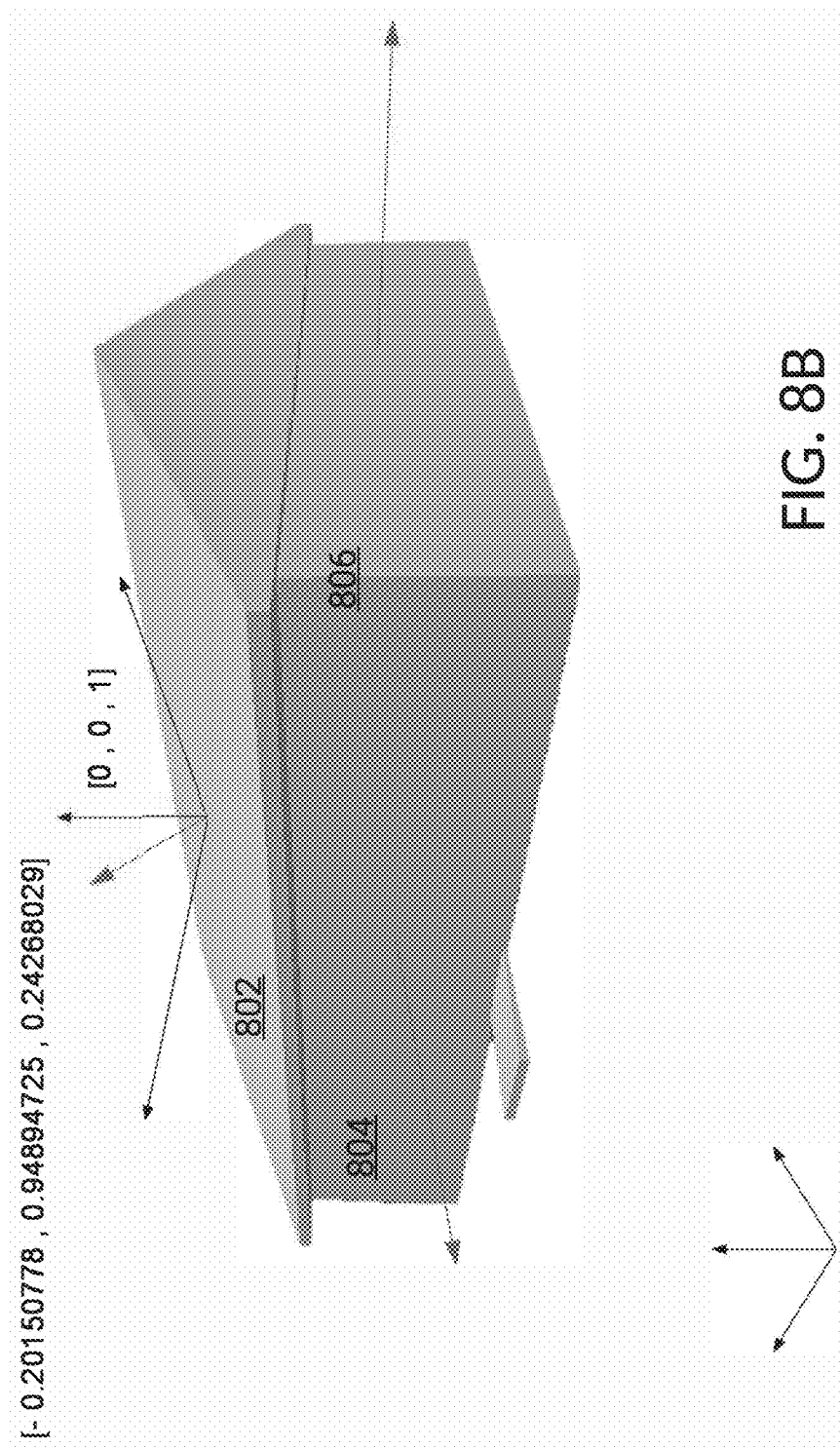
FIG. 8B illustrates surface normal comparison to a vertical axis of a coordinate system according to some embodiments.
Figure 9:
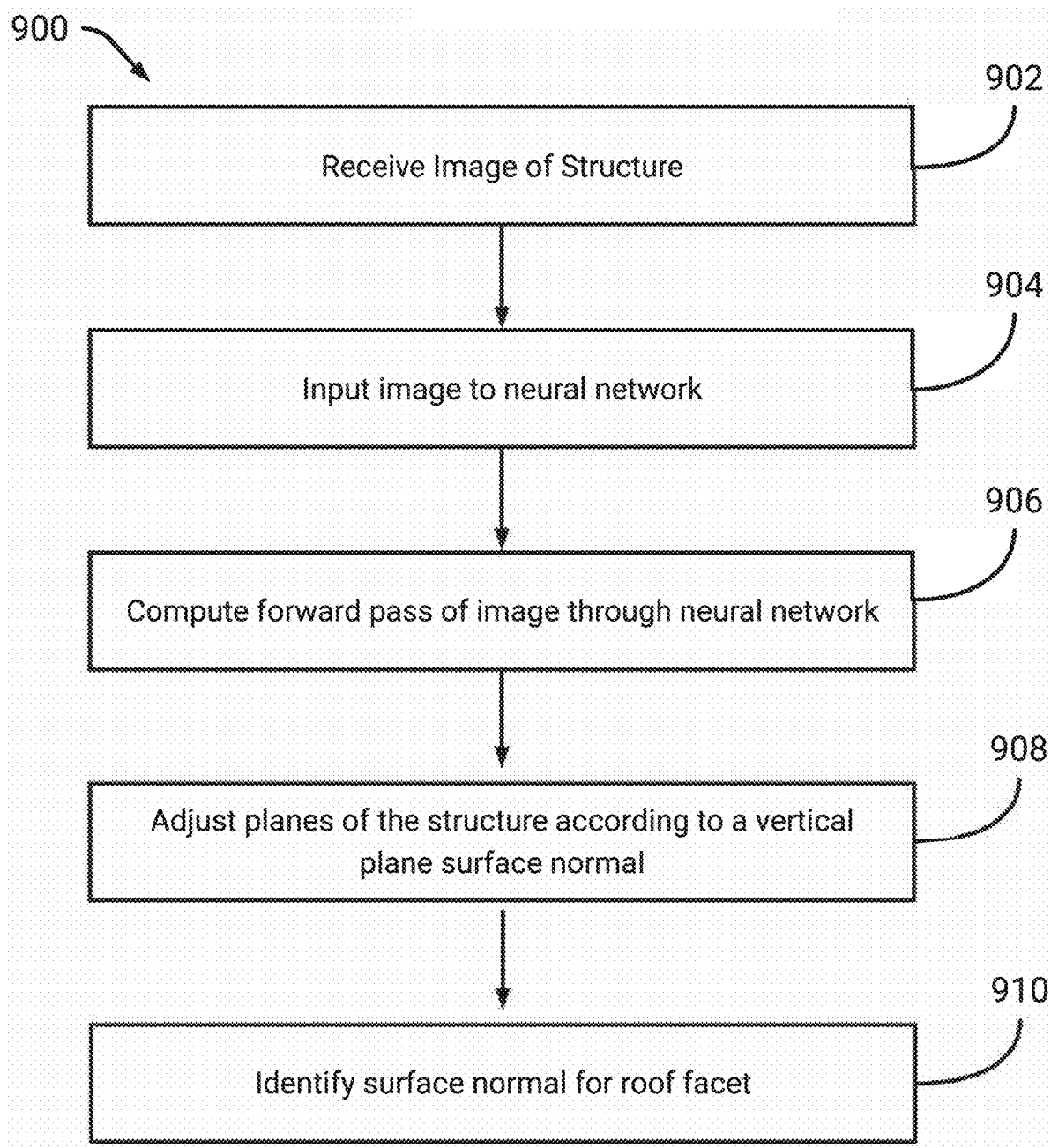
FIG. 9 illustrates a flow chart for using deep learning to determine a surface normal for a roof facet.

FIGS. 8-9 describe use of machine learning techniques to determine the surface normal. As will be described below, a machine learning model (e.g., a neural network) may be used to segment one or more images of a structure. Example segmentation may include labeling, or otherwise identifying, a roof facet of the structure. In some embodiments, the machine learning model may be trained to directly extract the surface normal from the segmented roof facet. For example, the neural network may include a multitude of convolutional layers followed by a fully connected network trained to estimate the surface normal. In some embodiments, the machine learning model may segment the image and additional techniques may be used to determine the surface normal. Feature specific segmentation is described further with respect to FIGS. 4A-4G.

Similar to the above, the surface normal may then be compared with the gravity vector to extract pitch. In some embodiments, the neural network may determine the gravity vector or may assign the gravity vector as a constant (e.g., vertically downwards).

Figure 10:
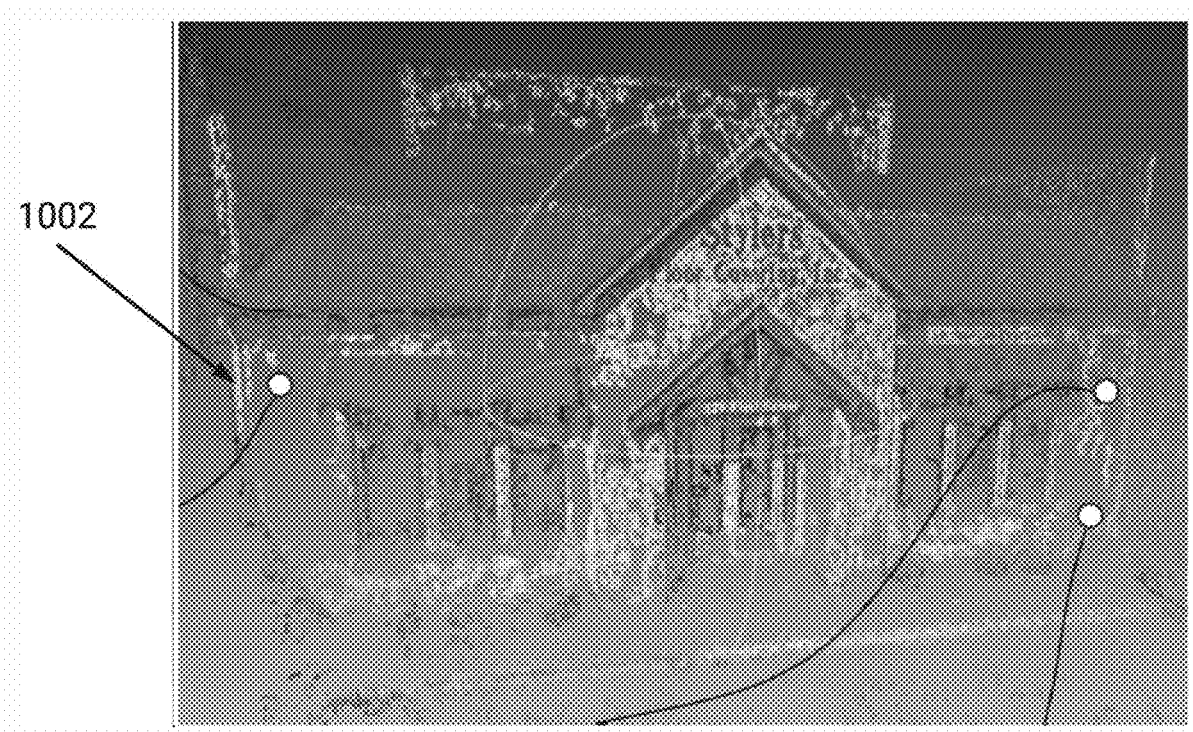
FIG. 10 illustrates a point cloud of a structure generated from an imaging device according to some embodiments.
Figure 11:
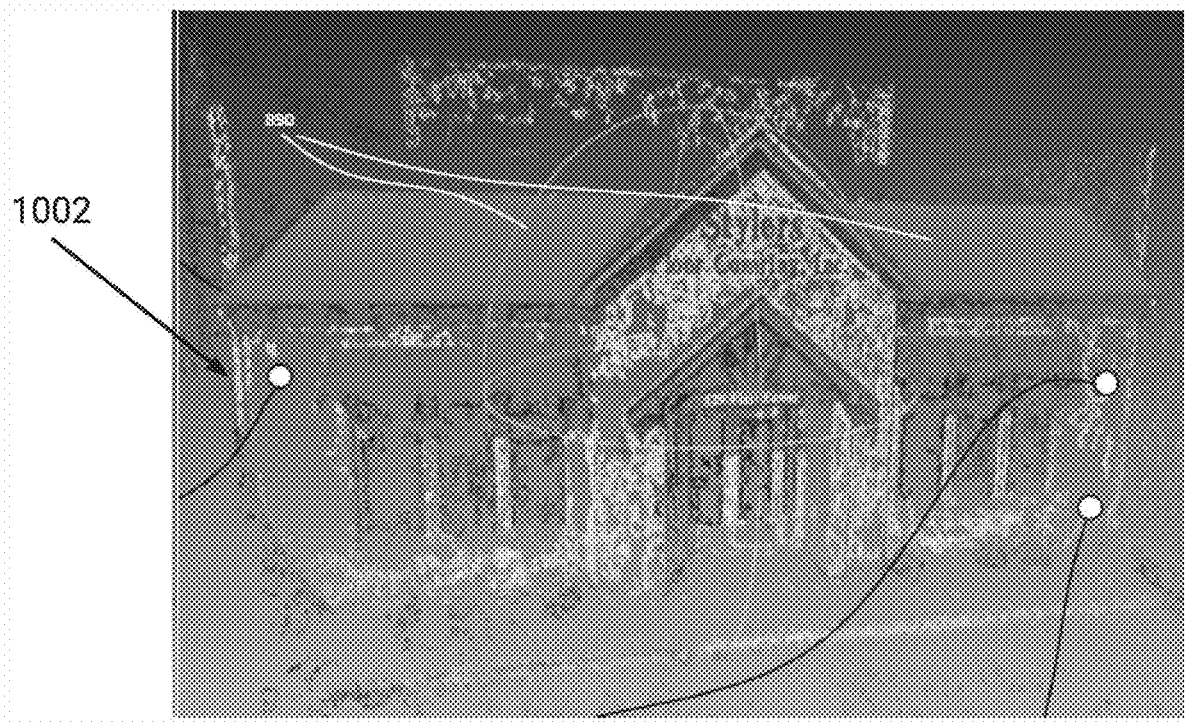
FIG. 11 illustrates segmentation of roof facets in a point cloud according to some embodiments.
Figure 12:
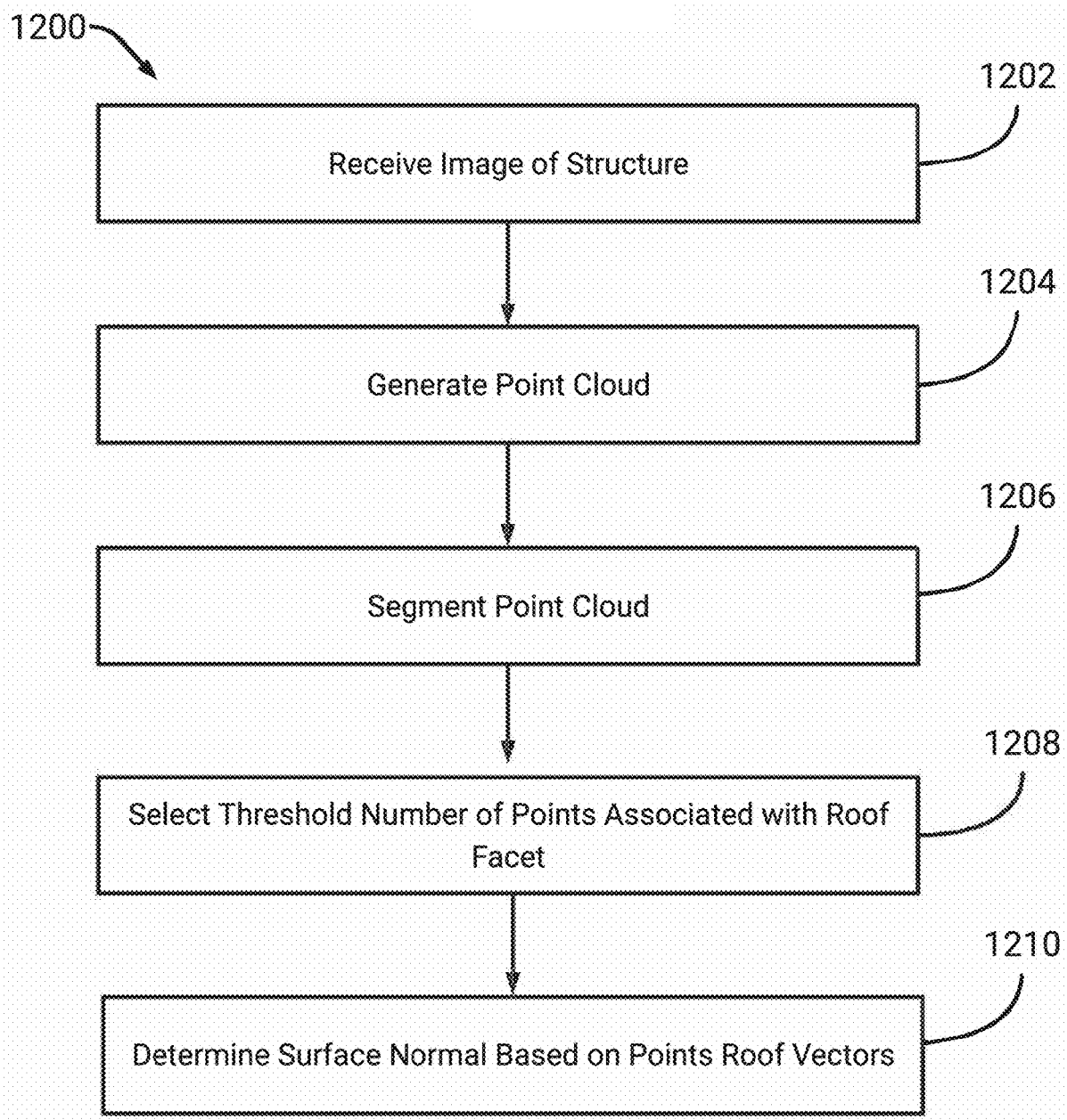
FIG. 12 illustrates a flow chart for using point clouds to determine a surface normal for a roof facet.

FIGS. 10-12 describe determining the surface normal via use of a point cloud. The point cloud may be generated, or accessed, via combining one or more images of the structure. For example, a user may traverse the exterior of the structure and obtain images. In this example, the user device utilized by the user may indicate locations at which the user is to obtain images. In this example, the locations may be based on one or more of a global navigation satellite system location of the user device, an inertial measurement unit of the user device, and/or computer vision techniques regarding point of view of the user device with respect to the structure.

Based on the point cloud, a selection of a threshold number of points which form part of the roof facet (e.g., three points) may be effectuated. These three points may be used to determine a plane associated with the roof. Based on this plane, a surface normal may be determined. The three points may additionally, or alternatively, be used to determine two vectors. A system of the user device may determine a cross-product of these two vectors to identify the surface normal for the roof facet. The surface normal may then be compared to a gravity vector of the structure to extract the pitch of the roof facet.

The above, and additional aspects of the disclosed technology will now be described with reference to the Figures.

Figure 1B:
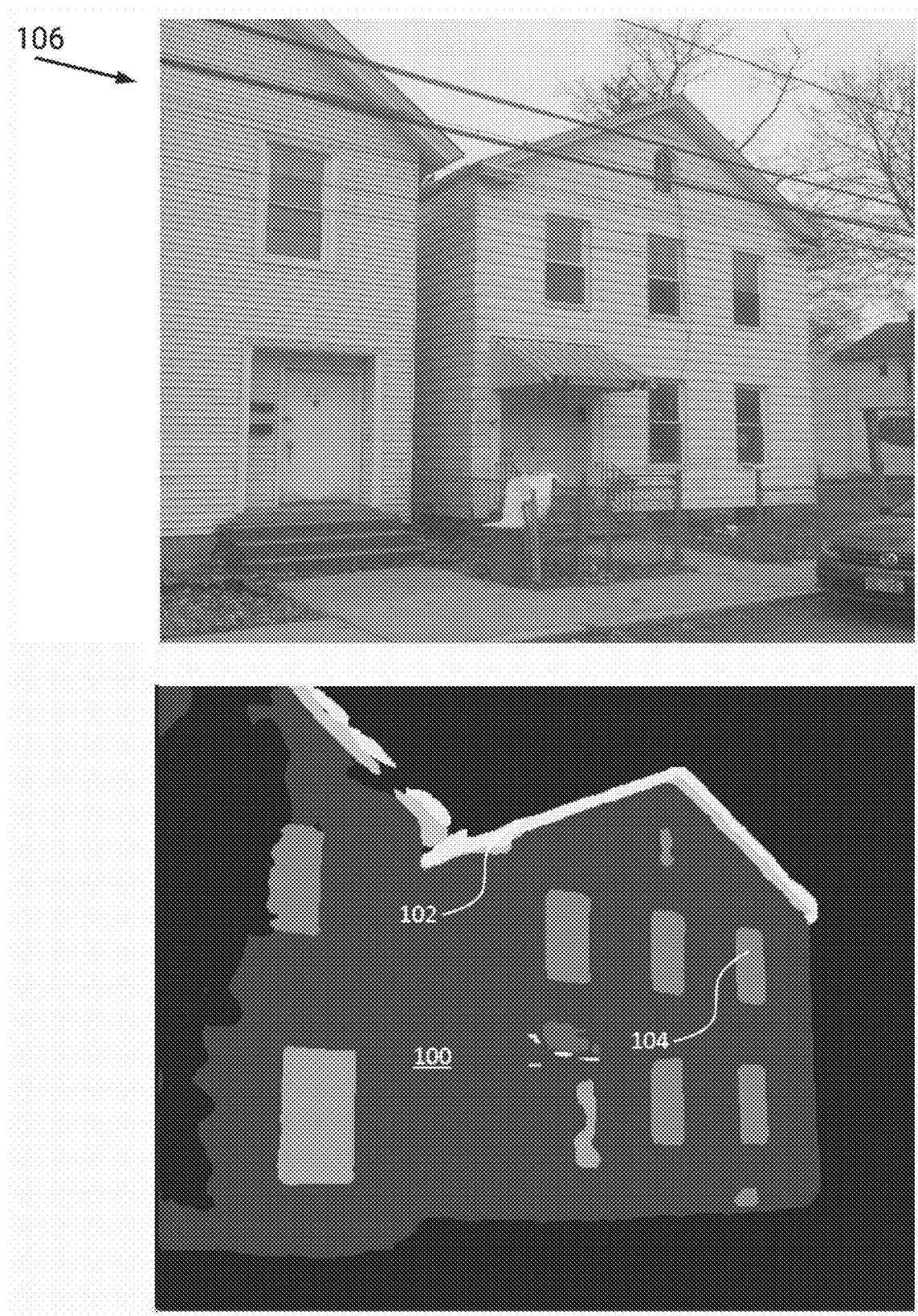
FIG. 1B illustrates an example of structural segmentation according to some embodiments.

FIG. 1B illustrates a segmentation of an image 106 of a house 100. As described above, the image 106 may represent an image obtained via a user device of a user.

In the illustrated embodiment, the house 100 is segmented using semantic labels of the house 100 or a portion of the house 100, with window features 104 and a roof rake 102. Such automated techniques may be useful in determining reliable geometric values for subsequent processing. For example, and as will be described, a surface normal to the roof may be determined based on a rake vector from rake 102 (e.g., a vector following rake 102) and a gravity vector.

Examples of subsequent processing include linear analysis and vanishing point pairing such as according to the techniques of U.S. Provisional Patent Application 62/893,100 and U.S. Provisional Patent Application 62/983,324, which are hereby incorporated by reference herein. Vanishing point pairing may be used to determine the gravity vector as will be described in FIGS. 2-3 below.

A vanishing point, as described at least in U.S. Provisional Patent Application 62/893,100 and International Application No. PCT/US2020/048263 which are hereby incorporated herein by reference, may represent a point associated with a boundary of a feature or parallel lines of that structure within an image. Vanishing points may in turn be used to establish coordinate systems for images, where the coordinate systems' axes point from an origin to a respective vanishing point. With respect to FIG. 3, from an origin at 822, vanishing point axes may extend outwards, and parallel the respective structural lines such as the lower portion of the structure in FIG. 3. A vertical vanishing line 826 may, in some embodiments, be understood to be a gravity vector or associated with a camera gravity vector for a camera coordinate system 824. Vertical vanishing line 826 may thus be used as a substantially vertical vector. Thus, a vertical vanishing line 826 may be used as a gravity vector. In some embodiments, the structure's coordinate system as established by its vanishing point coordinate system, is adjusted so that vertical vanishing line 826 and the gravity vector of camera coordinate system 824 are parallel. Additional vanishing points (e.g., left vanishing point, right vanishing point) may additionally be determined as described in U.S. Patent Provisional Application No. 62/893,100.

Figure 2:
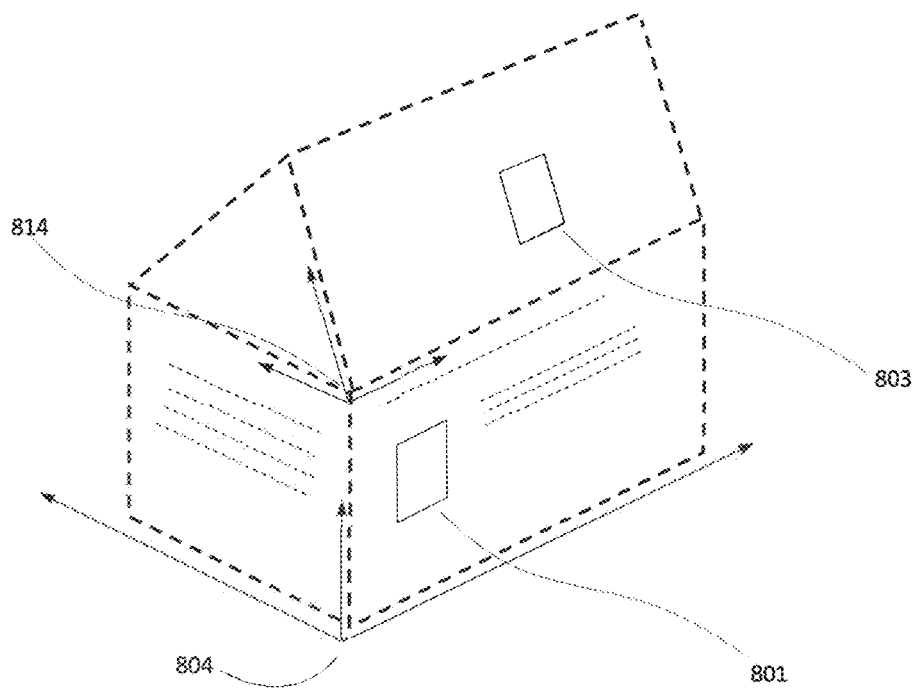
FIG. 2 illustrates vanishing point coordinate systems associated with a structure according to some embodiments.

FIG. 2 illustrates an example of an image of a structure with multiple vanishing point coordinate systems according to some embodiments. The illustrated example includes a home having a window 801 which aligns to the home's vanishing points (associated with origin 804) but has a sky light 803 disposed on a roof. Thus, the window 801 may be understood to be on a wall which is oriented vertically downward. The roof's vertical vanishing lines, however, do not point in the same direction as in the coordinate system of 804; directly up as according to gravity does not traverse the vertical vanishing lines of the roof in FIG. 2 or the lines of coordinate system 814. Imposing a direct vertical vanishing point to sky light 803 would not properly account for the angular offset imposed by the roof's pitch. The structure of FIG. 2, then, has at least two vanishing point coordinate systems. In some embodiments, the differences between those two systems can be leveraged to output a roof facet pitch.

Figure 3:
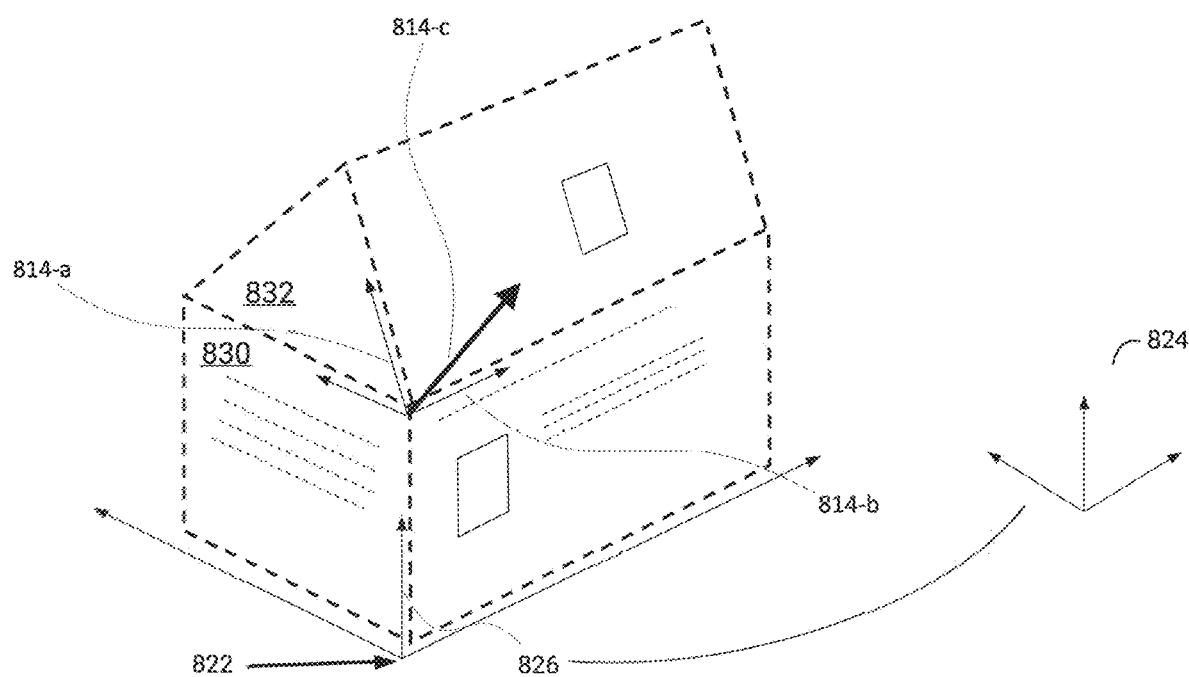
FIG. 3 illustrates surface normal relationships in structure facets according to some embodiments.

FIG. 3 illustrates surface normal relationship in structure roof facets according to some embodiments. In the illustrated example, FIG. 3 has a first vanishing point coordinate system 822 for a structure, having an origin at the point indicated by the callout for reference no. 822 and vertical vanishing line 826, which may be a gravity vector or adjusted to be a gravity vector according to camera coordinate system 824. As described herein, the vanishing line 826 may be utilized to extract roof pitch, even though the roof geometries are associated with a different vanishing point coordinate system.

In some embodiments, the coordinate system 814 associated with the roof is, at least in part, distinct from that of the coordinate system 822 associated with the gravity vector 826. For example, these coordinate systems 814 and 822, may be askew or otherwise oriented differently from each other. Further, as the orientations appear in a 2D image, merely determining a rake vector 814-a (which follows a rake of roof 832) as it appears within the image may be insufficient to accurately determine pitch because the structure's pitch exists in the real world independent of a camera's particular pose. That is, the orientation of vector 814-a in a 2D image may not indicate the true orientation of that vector in the real world because the perspective projection in a third dimension is not accounted for in a 2D image (which is generated as a function of the camera's orientation at the time of image capture). A derived surface normal, however, possesses three dimensional attributes, and surface normal 814-*c* for the roof facet may be determined from rake vector 814-*a*. The surface normal 814-*c* may then be compared with the gravity vector 826 to inform orientation of the rake vector 814-*a* in the real-world space and not simply image space. Once oriented in real-world space, the vector may be indicative of the pitch of the roof facet, as explained with reference to FIG. 1A.

To determine the surface normal 814-*c*, an image of the structure may be analyzed. For example, segmentation may be used to identify lines that serve as boundaries for surfaces of the structure. With respect to FIG. 3, the segmentation may be used to label, or otherwise characterize, a wall portion 830 (e.g., a wall plane) from a roof portion 832 of the structure. As will be described, these portions 830-832 of the structure may be used to determine an eave vector 814-*b* and the rake vector 814-*a*. A cross product of the eave vector 814-*b* and rake vector 814-*a* may then be computed to identify the surface normal vector 814-*c*.

Without being constrained by way of example, segmentation may be performed using automated or semi-automated techniques. For example, a machine learning model may be used to segment an image of the structure. In this example, a neural network may be trained to identify specific portions of structures. As an example, training data including boundaries associated with specific portions may be used as ground truth. As another example, respective masks or other overlays may be applied to specific portions of an image of a structure. The neural network, such as a convolutional neural network, may then be trained to segment images of structures.

With respect to machine learning, the segmentation may allow for extraction of boundaries about the segmented portions. Thus, the eave vector 814-*b* and rake vector 814-*a* may be determined as the boundary for associated segmented portions. With respect to the eave vector 814-*b*, the associated segmented portion may represent a boundary of a wall. With respect to the rake vector 814-*a*, the associated segmented portion may represent a boundary of a gable. These boundaries may be converted to vectors using, for example, a coordinate system (e.g., coordinate system 814).

Figure 4A:
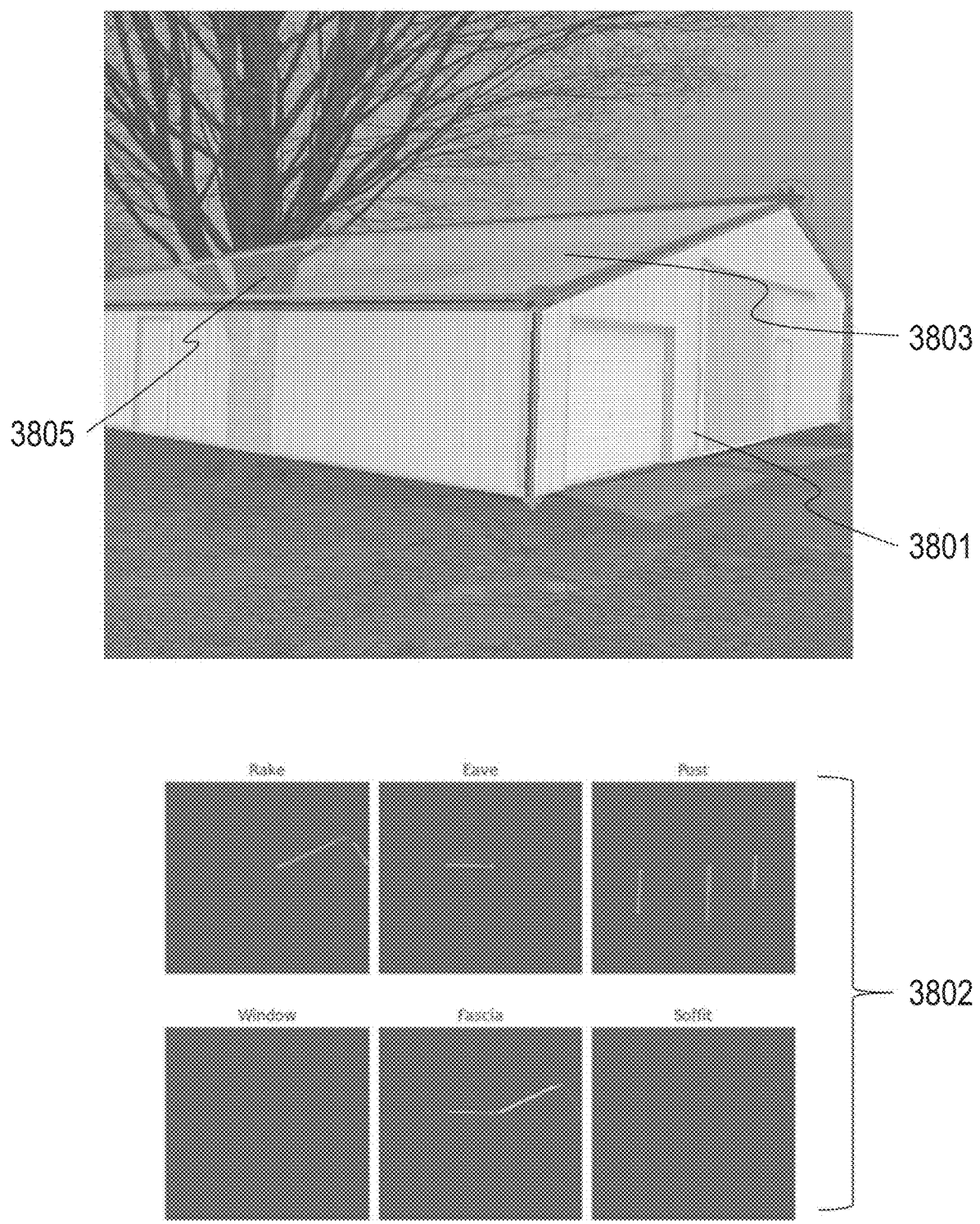

In some embodiments, segmentation may be performed using segmentation masks specific for one or more classifications for sub-features in an image. FIG. 4A depicts structure 3801 and a plurality of segmentation channels 3802 for subfeatures of structure 3801. Among the channels in group 3802 are segmentation masks for rakes (e.g. lines culminating in apexes on roofs), eaves (e.g. lines running along roof edges distal to the roof's ridge), posts (e.g. vertical lines of facades such as at structure corners), fascia (e.g. structural elements following eaves), and soffit (e.g. the surface of a fascia that faces the ground). Many more subfeatures and therefore channels are possible, such as ridge lines, apex points, and surfaces are part of a non-exhaustive list.

In some embodiments, the segmentation mask as shown in any one channel of group 3802 may be aggregated. For example, knowing that a gable is a structural representation of rakes and posts, a new channel may be built that is a summation of the output of the rake and post channel. As roofs are a geometric representation of rakes, eaves, and ridges, those masks may be aggregated to form a roof mask channel. In some embodiments, a cascade of channel creation or selection may be established. While a single channel for a structure on the whole may be a preferred channel, a second channel category may be for sub-structures such as a gable or roof, and a third channel category the foundational elements of sub-structures such as subfeatures like fascia, windows, posts, etc.

Channel selection may cascade through these categories. A user may select a channel, or channels are selected for or suggested based on what masks are eligible based on the segmentation channel outputs. In some embodiments, a segmentation channel is an activation map for the data in the image frame (pre- or post-capture) indicating a model's prediction that a pixel in the image frame is attributable to a particular classification of a broader segmentation mask. The activation maps are, then, an inverse function of a segmentation mask trained for multiple classification. By selectively isolating or combining single activation maps, new semantic information, masks, and bounding boxes can be created for the scene within the image frame and guidance prompts provided to optimize framing for those elements.

In some embodiments, a neural network model comprises a plurality of layers for classifying pixels as particular subfeatures within an image. A final convolution layer separates out, into desired subchannel(s), outputs representing only a single classification of the model's segmentation mask. This enables feature representations across the image to influence prediction of subfeatures, while still maintaining a layer optimized for a specific feature. In other words, a joint prediction of multiple classes is enabled by this system. While the presence of points and lines within an image can be detected, shared feature representations across the network's layers can lend to more specific predictions; for example, two apex points connected by lines can predict or infer a ridge more directly with the spatial context of the constituent features. In some embodiments, each subchannel layer output is compared during training to a ground truth image of those same classified features and any error in each subchannel layer is propagated back. This results in a trained model that outputs N channels of segmentation masks corresponding to a target subfeatures of the aggregate mask. Merely for illustrative purposes, the six masks depicted among group 3802 reflect a six feature output of such a trained model. Each activation map in these channels is a component of an overall segmentation mask (or as aggregated a segmentation map of constituent segmentation masks).

Figure 4B:
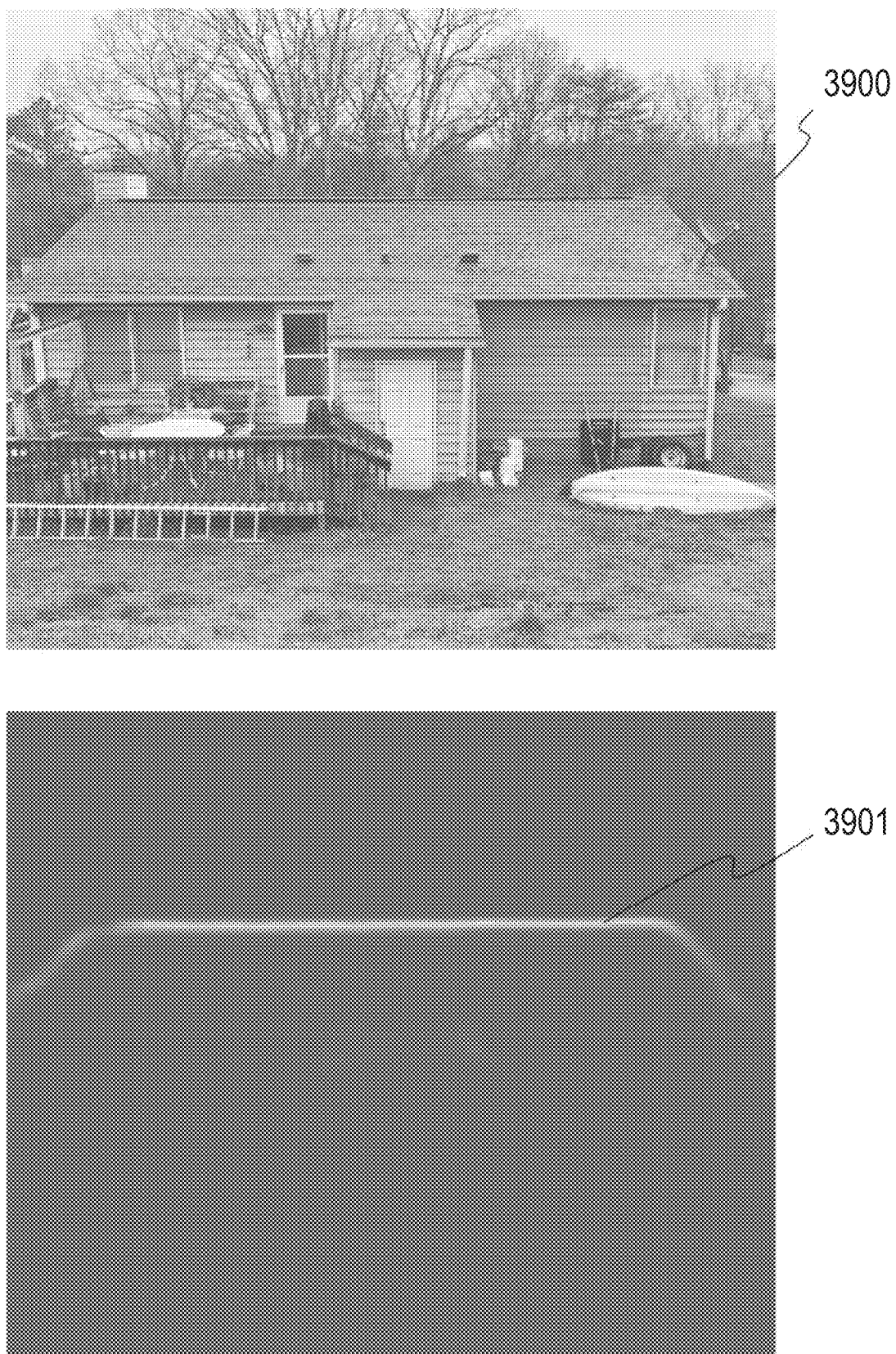
Figure 4C:
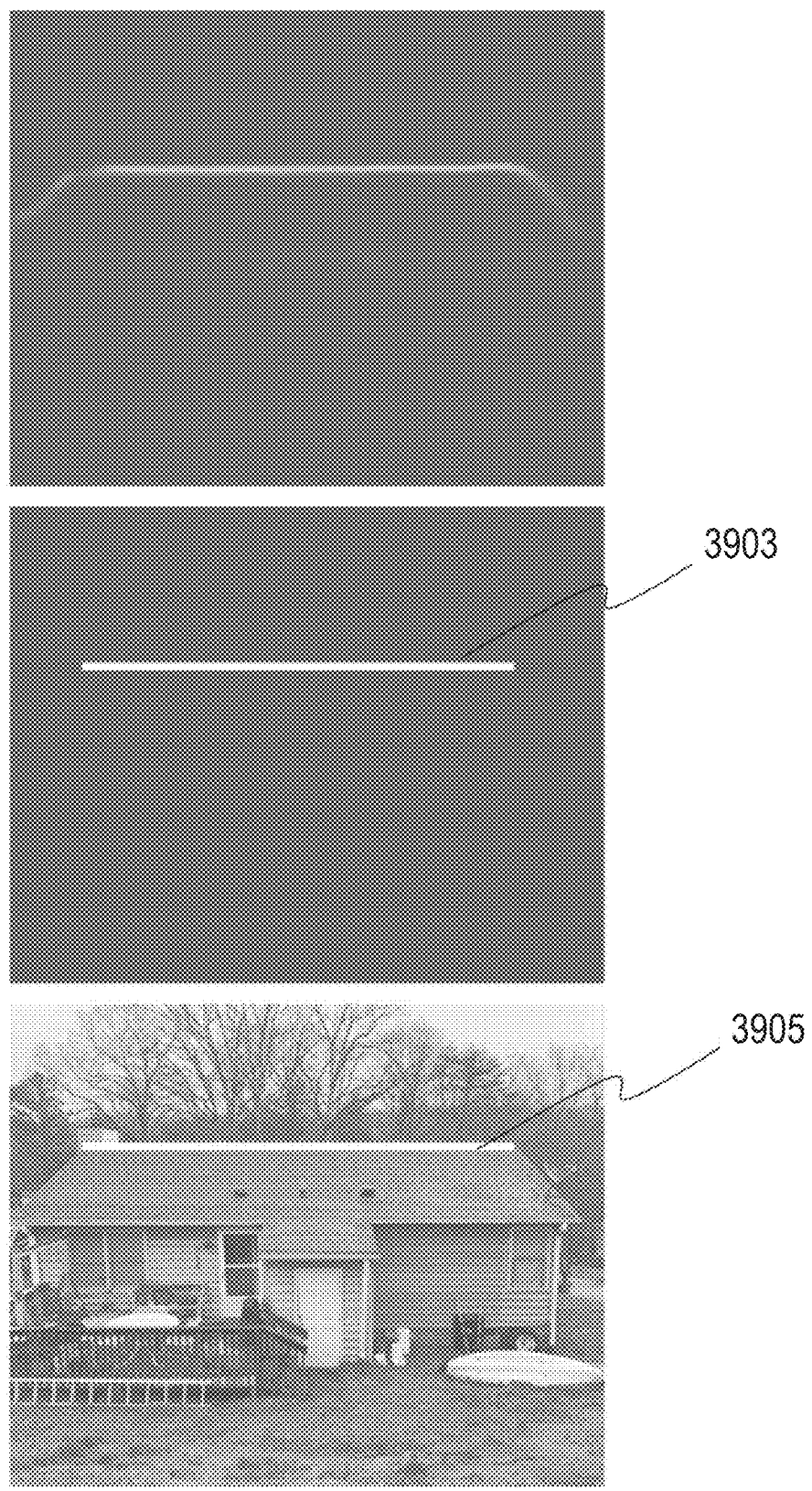

In some embodiments, an activation map output is further refined using filtering techniques. Keypoint detection such as Harris corner algorithm, line detection such as Hough transforms, or surface detections such as concave hull techniques can clean noisy output. Referring to FIG. 4B, activation map 3901 is one of a plurality of activation maps for image 3900, in this case a ridge line for a roof. As this activation map corresponds to a linear feature, a linear detection technique may be applied to mask 3901, resulting in smoothed linear feature 3903 of FIG. 4C. This linear feature may then be overlaid on image 3900 to depict a semantic labeling 3905. As discussed above, when grouped with other such activation map outputs or refined representations, more precise segmentation masks may be applied to a scene.

Data collection for damage reports especially benefit from such isolated masks. For example, damage types typically occur in associated areas: hail on roofs, wind on siding. If damage assessment imaging tools were to look for specific damage, segmenting an image frame into targeted areas for closer inspection and guiding an imager to appropriately capture such feature expedites evaluation. A drone piloting about a house to collect images for assessing damage can isolate subfeatures within a frame associated with a particular category of damage and guide imager positioning for that specific feature based on the activation map channel output.

Figure 4E:
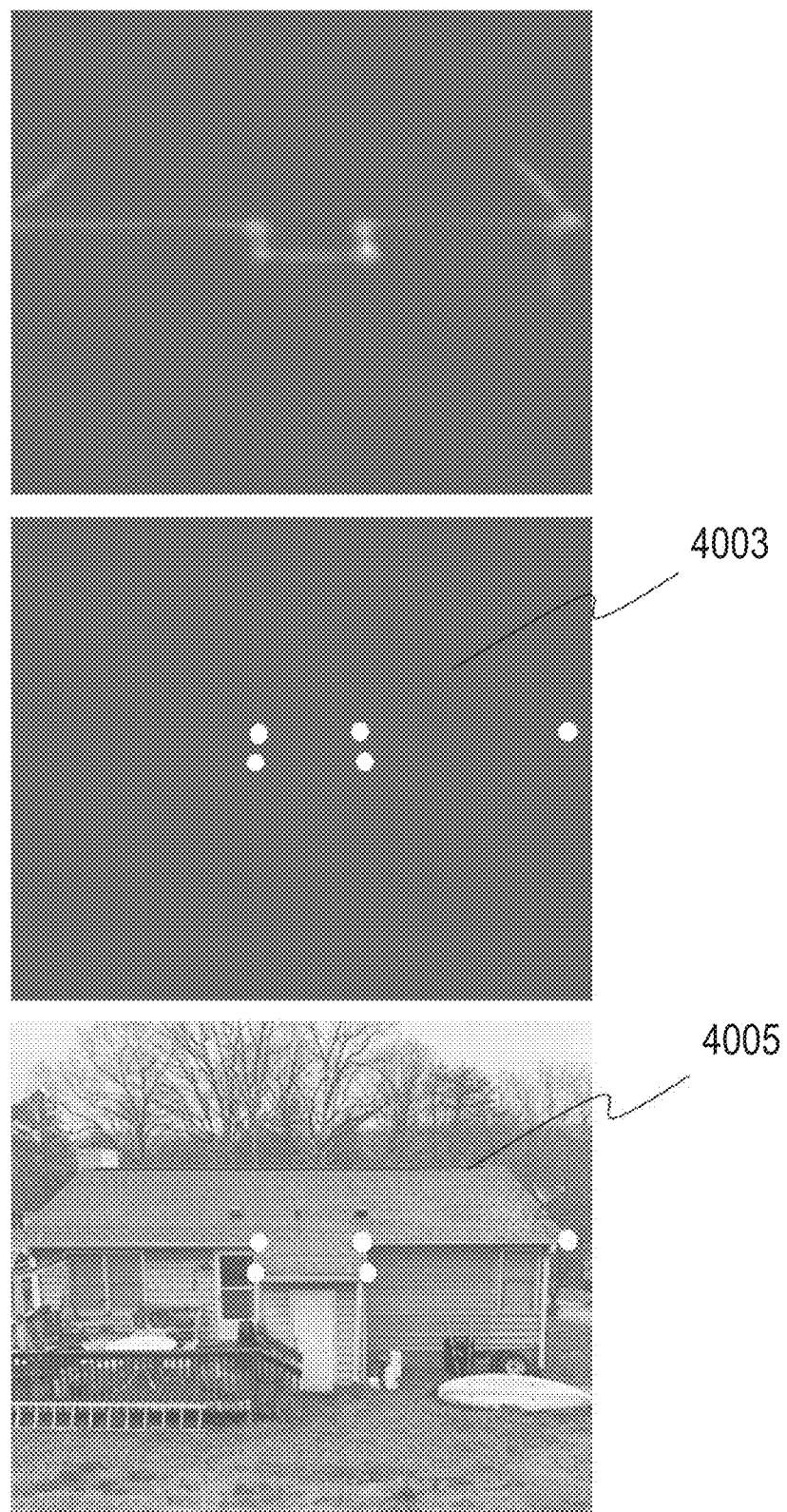

As another illustrative example, FIG. 4D depicts the input image 4000, the same as input image 3900 of FIG. 4B but with activation map 4001 for the fascia of the house (e.g., structural element following an eave) applied. While linear detection techniques operated upon this activation map would produce clean lines to the noisy data depicted in 4001, other techniques such as keypoint detection with Harris corner detection can reveal fascia endpoint channel 4003 that show semantic point labeling 4005, as shown in FIG. 4E. These channels can be applied in building block like fashion to provide clean labeling to an image that overlays a structure, even over occlusions.

Figure 4F:
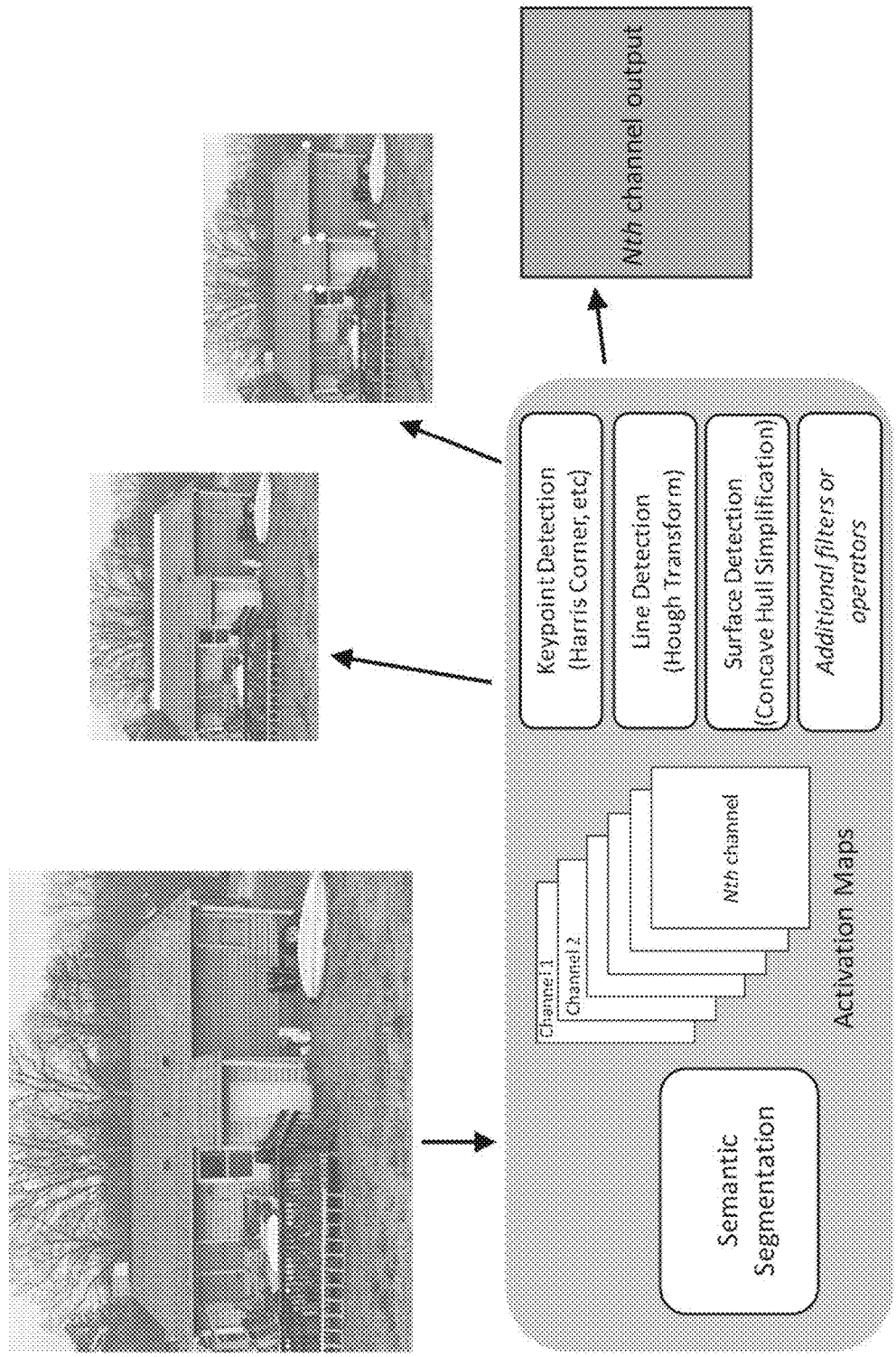
Figure 4G:
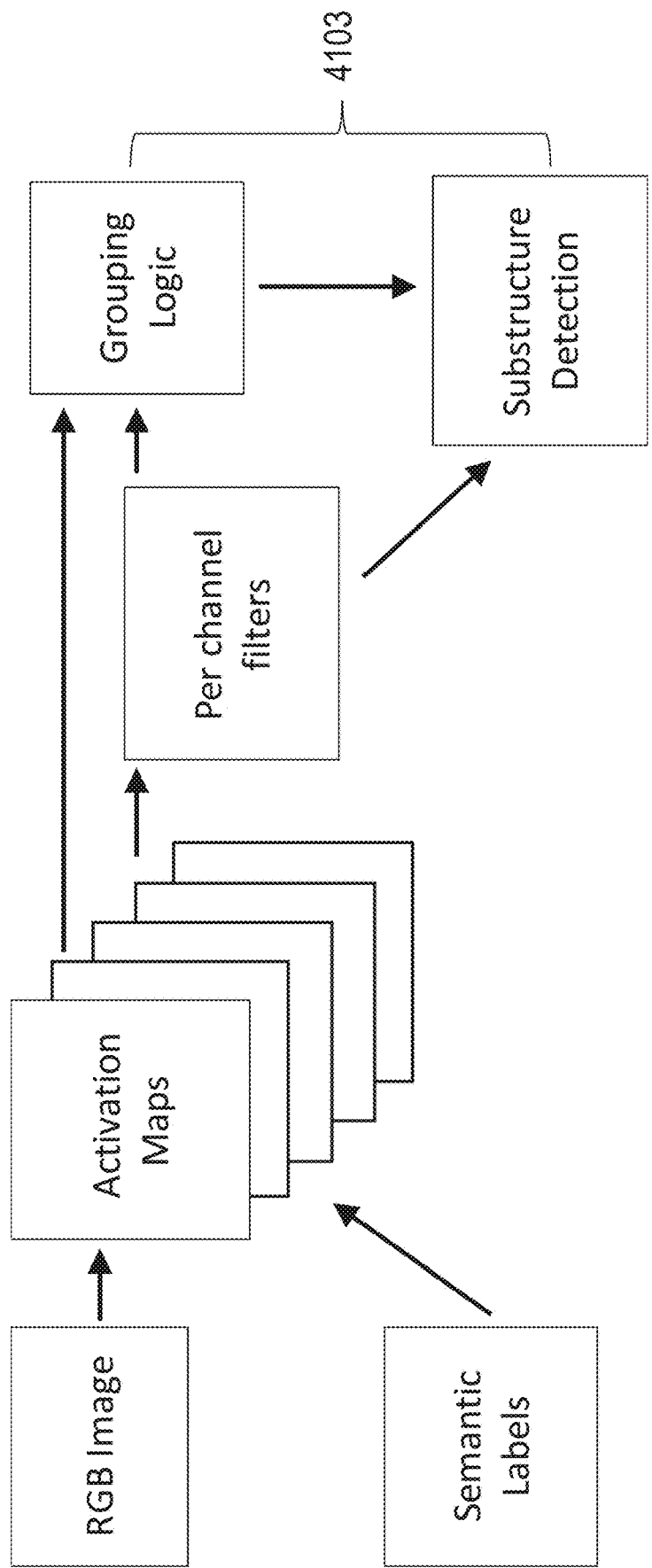

FIGS. 4F-4G illustrate this semantic scene understanding outputs as channels, wherein an input image is segmented for a plurality of classifications, and each classification is extracted into a respective activation map. The activation map may be further refined according to computer vision techniques applicable to that particular channel's feature, though this step is not required. Channel outputs may be grouped according to logic 4103 or otherwise aggregated to create substructures for the input subject, and bounding boxes fit to the resultant segmentation mask of constituent channels.

For the various segmentation schemes discussed herein, while automated techniques may be preferable, segmentation may also be performed using input from a user (e.g., human in the loop). As an example, the user may obtain an image of the structure. For this example, the user may be located proximate to the structure and may obtain the image via his/her user device. As another example, the user may access a previously-taken image of the structure (e.g., the user may select from amongst a multitude of structures with associated images). An application, or other user interface, may thus present the image of the structure.

The user may then identify specific portions of the structure which are relevant to determining the surface normal 814-*c*. For example, the user may use his/her finger to sketch a boundary of a specific portion. In this example, the user may assign a label to the portion (e.g., gable, wall portion, front wall portion, roof facet, and so on). The application, such as executed by a system or user device, may determine a boundary based on the sketched portion. For example, the system or user device may adjust the sketched boundary to filter points included therein.

As an example, the system or user device may determine measures of central tendency of points included in the sketched boundary. Via these measures of central tendency, the system or user device can filter points greater than a threshold metric from the measures along a length of the boundary. Optionally, the system or user device may use edge detection techniques (e.g., a canny edge detector, a neural network) to determine an expected boundary. The user's sketched boundary may then be fit to, or otherwise combine with, this expected boundary.

Segmentation may also be useful in determining the vanishing point coordinate systems described above. Segmentation can identify lines associated with the walls of a structure, where the ground and the walls of the structure meet, and where walls of the structure meet. In some embodiments, a vanishing point can be determined with reference to where the ground and the walls of the structure meet, such as an x-axis or y-axis vanishing point. In some embodiments, a vanishing point can be determined with reference to where walls of the structure meet, such as a z-axis vanishing point.

FIG. 5 illustrates roof pitch effects on image area determinations, such as determining the square footage of an angled surface in image. In FIG. 5, a front view of a home having roof facet 840 is included. While the pixel area for roof facet 840 may be represented directly in image information, without knowing the angular deflection away from the image plane of roof facet 840 (e.g., the pitch of the facet) the pixel area representation would be incorrect as to the true geometric area of roof facet 840.

In some embodiments, determining the pitch of roof facet 840 permits applying a transformation or rotation to facet 840, or otherwise processing the pixel area in light of the pitch value, to extract its true geometric values. For example, a surface normal to the roof facet 840 may be determined based on a rake vector and an eave vector. This surface normal may then be compared to a vertical vanishing line or gravity vector to extract the pitch of the roof facet 840.

FIG. 6A illustrates a vanishing point coordinate system 500 for a structure 502 and segmented roof lines eave 504 and rake 506 according to some embodiments. The vanishing point coordinate system 500 for the structure 502 may be determined according to the description of U.S. Provisional Patent Application 62/893,100, which is hereby incorporated herein by reference. As depicted in FIG. 6A eave 504, and therefore a corresponding eave vector for eave 504, aligns to the left vanishing point and follows that vanishing axis of coordinate system 500. Because rake 506 is disposed on the roof which has its own line orientations, it does not share all axes and vanishing points of coordinate system 500.

In FIG. 6A, an eave line 504 and rake line 506 are illustrated. These lines may be identified, or determined, according to, at least, the techniques described in FIGS. 3-4G. For example, automated or semi-automated techniques may be used to determine the lines 504 and 506.

Figure 6B:
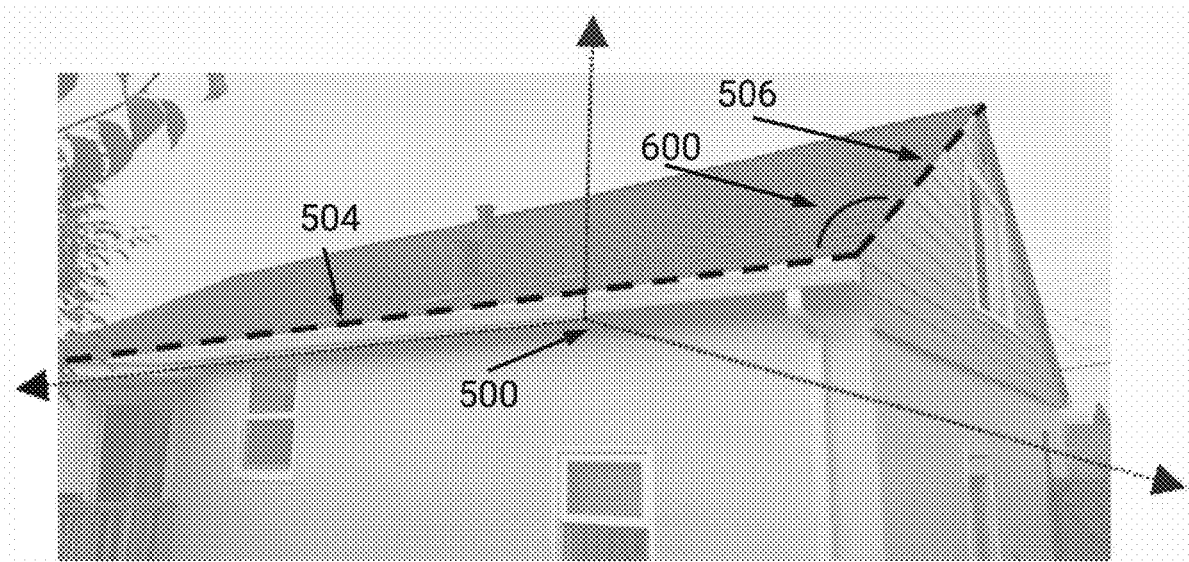
FIG. 6B illustrates calculating a cross product of the roof lines according to some embodiments.

FIG. 6B illustrates calculating a cross product of the segmented lines 504 and 506 in an image of a structure according to some embodiments. To determine a surface normal, a user device or system may compute a cross product of the eave line 504 and rake line 506. As illustrated in FIG. 6B, eave vector 504 and rake vector 506 meet at a right angle depicted as angle 600, due to the camera pose (related to the camera coordinate system) this right angle as it exists in the real-world appears as an obtuse angle in the image space of FIG. 6B. In some embodiments, a transformation is applied to the eave vector and rake vector to generate vector orientations for the appropriate right angle relationship; the inverse of this transformation is applied to the cross product to derive the surface normal for the image space and comparison to a gravity vector.

Figure 6C:
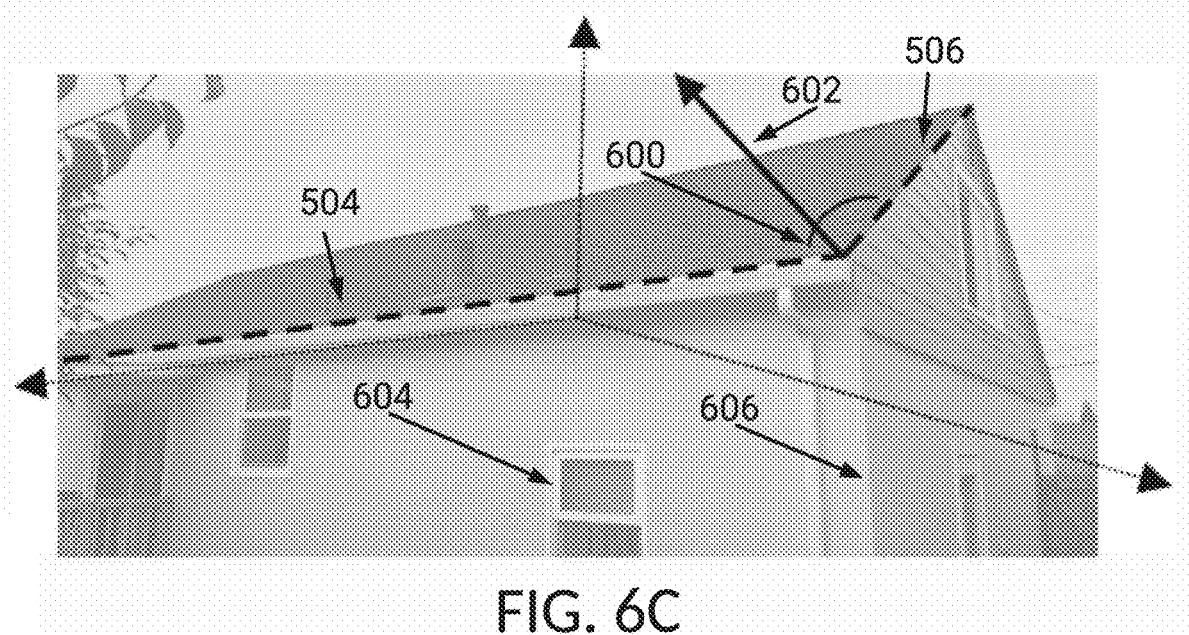
FIG. 6C illustrates generating a roof facet surface normal according to the cross product according to some embodiments.

FIG. 6C illustrates generating a roof facet surface normal 602 according to the cross product according to some embodiments. An example surface normal 602 is illustrated in FIG. 6C. Depth analysis many optionally determine any vanishing point associated with the roof lines to ensure the surface normal 602 orientation is away from the roof facet and does not have an anti-commutative orientation pointing into the plane.

The vertical vanishing line of coordinate system 500 or gravity vector otherwise (for example, a user device which captured the image may indicate the gravity vector) may be compared to surface normal 602. The angular difference between these two vectors indicates the pitch of the roof.

The gravity vector may additionally be determined based on lines associated with features of the image. For example, a system or user device may identify window 604 as being on a wall of the structure. In this example, the system or user device may assume that the window 604 is positioned on a substantially planar surface which extends vertically downwards. Thus, the gravity vector may be assumed to extend from the window 604 vertically downwards. Similarly, boundary 606 may be assumed to be vertically downward. Additional description related to vanishing lines and axes, of which vertical lines may be analogous to gravity vectors, is included in U.S. Patent Provisional App. No. 62/893,100.

Figure 7:
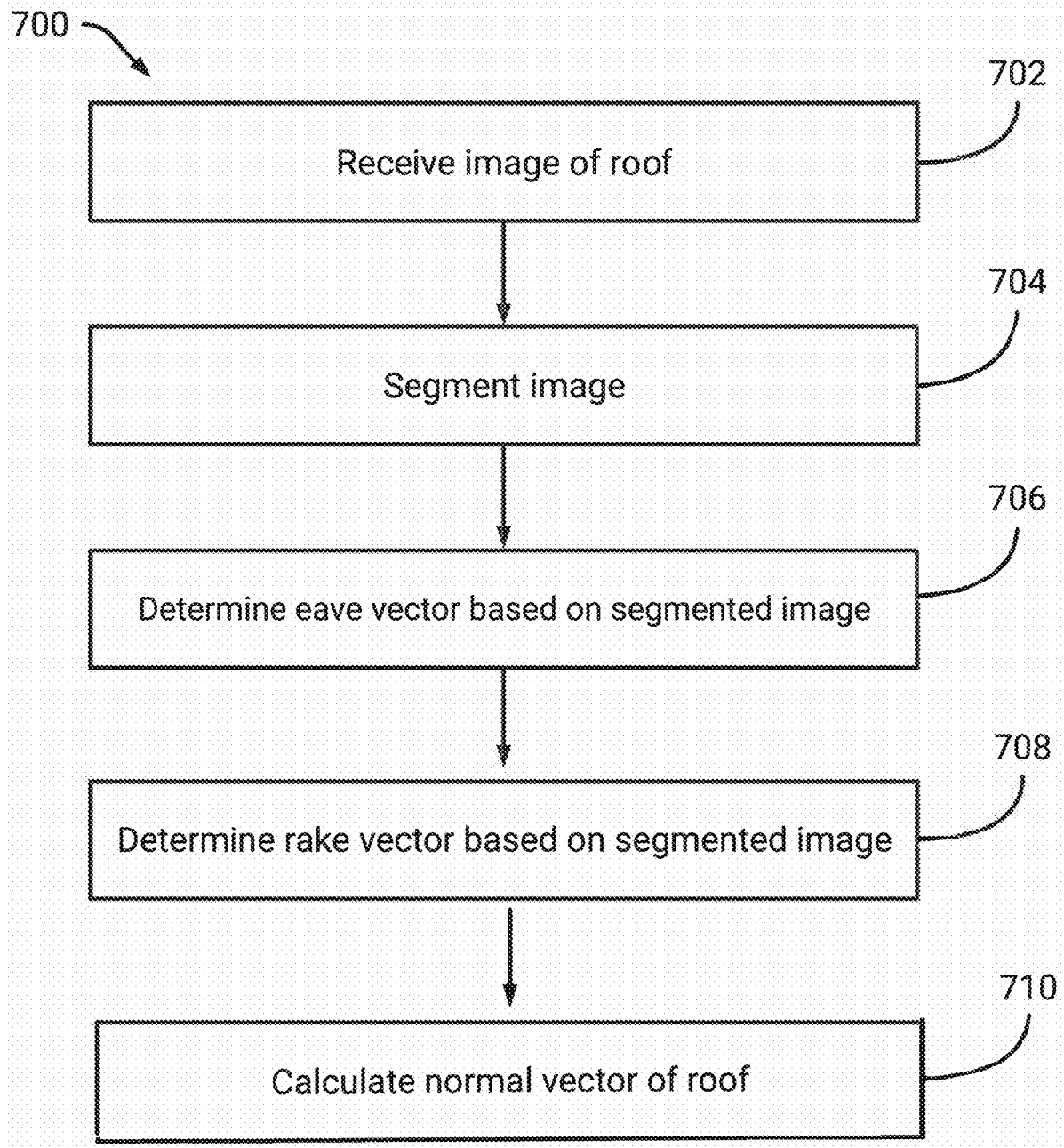
FIG. 7 illustrates a flow chart for using lines on an image to determine a surface normal for a roof facet.

FIG. 7 illustrates a flow chart of an example process 700 for using an image to determine a surface normal for a roof facet. For convenience, the process 700 will be described as being performed by a user device or system of one or more processors (hereinafter referred to as a system).

At block 702, the system receives an image of a roof. As described herein, the roof may be positioned on a structure (e.g., a residential or commercial structure) and may include one or more roof facets. For example, the roof may include multiple levels of roof facets and the process 700 may be used to determine surface normal for each roof facet.

At block 704, the system segments the received image. The image may be segmented according to example automated or semi-automated techniques. For example, a machine learning model may be used to segment the image. In this example, the machine learning model may label a portion of the image as corresponding to a specific label. Example labels may include a wall portion, a gable portion, a roof portion, or specific linear features such as eaves, rakes, ridges and so on.

While the above describes the system segmenting the image, in some embodiments the system may provide the image to an outside system for analysis. As an example, the system may use an application programming interface (API) to push the image for segmentation to a cloud system. In response, the system may receive the segmented image. As an example, the system may receive metadata indicating portions of the image which are associated with specific labels. As another example, the system may receive an adjusted image in which specific portions are assigned colors based on labels. In this way, the system may identify a specific portion of the image which represents a wall.

The image may also be segmented using, at least in part, user input from a user of the system. For example, the image may be presented to the user. In this example, the user may provide user input to select one of the labels (e.g., a wall portion). The user may then provide user input to indicate a boundary of the wall portion. Example user input may include touch-based input, such as the user dragging his/her finger or a digital pencil on a screen of the system.

Block 704 describes segmenting an image into distinct portions, such as a wall or roof. In some embodiments, the image may instead be segmented to identify relevant features of interest. Example features may include rakes (e.g., lines culminating in apexes on roofs), eaves (e.g., lines running along roof edges distal to the roof's ridge), posts (e.g., vertical lines of facades such as structure corners), fascia (e.g., structural elements following eaves), soffit (e.g., surface of a fascia that faces the ground), and so on. For this segmentation, an eave vector (e.g., described in block 706) and a rake vector (e.g., described in block 708) may thus be directly determined based on the segmentation.

At block 706, the system determines an eave vector based on the segmented image. The eave vector may represent a vector which traverses a horizontal edge at the bottom of a roof facet. In some embodiments, the eave vector may represent the upper extremity of the wall portion which connects to, or otherwise is associated with a boundary with, the roof of the structure. As described elsewhere, the eave vector may also be represented by other horizontal lines of the structure in the image, such as roof ridge lines, window lines and so on. The orientation of an eave vector may be used regardless of whether such line is actually associated with an eave.

In some embodiments, the eave vector may be indirectly derived from other physical features of the structure. For example, the eave vector may be identified based on a gable of the structure. In this example, the gable may present a portion (e.g., a triangular portion) of a structure defined by rakes and posts (vertical lines such as corners of the structure). Such a structure is shown, for example, in FIGS. 6A-6C. The eave vector may be identified as a line which extends between the lower extremities of the rakes of two gables, or a proxy ridge line connecting the apexes of the two gables.

Advantageously, the above-described automated or semi-automated techniques may be used to identify the eave vector in a multitude of styles of structures. For example, a convolutional neural network may learn to recognize indicia of a wall portion and an upper extremity thereof. In some embodiments, an output of a machine learning model may be presented to the user for confirmation. The user may adjust the determined eave vector within the received image of the roof. In this way, the user may refine the output of the model.

At block 708, the system determines a rake vector based on the segmented image. The rake vector, as described in FIGS. 2-3, may represent a line which traverses, or is oriented similarly in three-dimensional space, an edge of the roof facet though hip lines or valley lines may also be used as rake vectors. For example, the rake vector may follow an edge of the roof facet as it extends towards its particular vertical vanishing point. Similar to blocks 704-706, the system may use automated or semi-automated techniques to determine the rake vector. For example, a machine learning model may be used to segment the image to label, or otherwise identify, the roof facet. In this example, the model may thus identify an edge of the roof portion.

As may be appreciated, the image may not include the edge of the roof depending on a location at which the image was taken. For this example image, the system may estimate the rake vector as representing a shortest path from between a lower and upper extremity of the roof, such as connecting an apex to an eave. This shortest path may be assumed to correspond with an edge of a roof facet.

At block 710, the system calculates a normal vector of the roof facet. The system determines a cross-product between the eave vector and the rake vector. In this way, the normal vector may be mapped to a real-world coordinate system rather than the image coordinate system associated with the eave vector and rake vector. As described herein, the normal vector may be compared a gravity vector or vanishing point coordinate system to output the facet pitch.

FIGS. 8A and 8B illustrate a surface normal prediction using a machine learning model. The description below focuses on use of a neural network, such as a convolutional neural network, although additional machine learning models may be used and fall within the scope of the disclosure herein.

An example neural network may represent a convolutional neural network which feeds into a fully-connected network. The convolutional neural network may be used to segment an image, such as via assigning labels or other identifiers to portions of an image, and the full-connected network may output surface normal vectors to those portions. An example neural network may include the network described in Wang et al., Designing Deep Networks for Surface Normal Estimation, Proceedings of the IEEE Conference on Computer Vision and Pattern Recognition (CVPR), 2015, pp. 539-547, the entirety of which is incorporated herein by reference.

The example neural network may thus obtain an image and directly output, as an RGB color value, a prediction of the surface normal for a given surface. As may be appreciated, the neural network may be trained based on ground truth data which indicates segmentations of structures along with determined surface normal. During training the neural network may be trained to segment the structure using a multitude of convolutional layers. These layers may feed into one or more fully-connected layers which may assign, or otherwise indicate, labels associated with the segmentation. Optionally, the network may be trained to output a surface normal for one of the labels (e.g., the roof facet).

In the illustrated embodiment, surface normals for differing surfaces are determined by the machine learning model. For example, a roof facet 802, a first wall 804, and a second wall 806, have associated surface normals. The predicted surface normal are output as respective RGB colors with each color representing a particular orientation. A vector value may be assigned based on the associated red, green, and blue value with each axis associated with red, green or blue. A unit vector for the surface normal may be generated using the constituent color values. In other words, surfaces with a stronger red hue than green or blue align more towards an axis associated with the red channel axis. It will be appreciated that, in this grayscale representation, different shades of gray correspond to different colors.

The associated surface normals may be adjusted on the assumption the vertical facades should face straight up, and therefore have surface normals equal to [x,0,z]. As depicted in FIG. 8A, the façades 806 and 804 should be expected to be substantially vertical as they are walls to the depicted structure. Their respective surface normal orientations would similarly be expected to have a zero or near zero value for the y-value. FIG. 8A demonstrates that the predicted surface normal in fact has some dimensionality in the y axis for façades 804 and 806 (0.0495191 and 0.029712 respectively). In some embodiments, a transformation is applied to the image (e.g., all planes within the image) to align select façades to vertical, such that their surface normals have a zero y axis value. In applying this transformation, the surface normal for the other planes of the structure such as roof facet 802 will also adjust to a more accurate real-world orientation for pitch analysis. The original predicted surface normal, or adjusted surface normal, of facet 802 may then be compared to a gravity vector or vertical vector otherwise (e.g. a unit vector of [0,0,1] as depicted in FIG. 8B) to generate an angular difference between the two, and therefore the pitch of facet 802. The vector measurements illustrated in FIGS. 8A and 8B are for illustrative purposes only and may vary based on the image.

FIG. 9 illustrates an example flow chart of an example process 900 for identifying a surface normal of a roof facet using a neural network. For convenience, the process 900 will be described as being performed by a user device or system of one or more processors (hereinafter referred to as a system).

At block 902, the system receives an image of a structure. As described in FIG. 7, the system may receive an image for analysis.

At block 904, the system provides the image as an input to a neural network. An example neural network is described in Wang et al., Designing Deep Networks for Surface Normal Estimation, Proceedings of the IEEE Conference on Computer Vision and Pattern Recognition (CVPR), 2015, pp. 539-547, which is incorporated by reference and forms part of the disclosure herein. In some embodiments, the example neural network may be combined with a scene understanding or segmentation neural network usable to determine a specific portion of the image. For example, a segmentation neural network may be used to determine the roof facet of the image. A subsequent neural network, such as described by Wang et al. in the above-referenced article, may then be used to output the associated surface normal.

At block 906, the system computes a forward pass through the neural network. The system may compute a forward pass through a multitude of layers which form the neural network. An output, as described above, may represent an estimation of one or more surface normals for segmented portions of the image.

At an optional block 908, the image, planes of the structure in the image, or portions thereof are adjusted to align façade planes to a vertical orientation. In some embodiments, the adjustment is by a transformation resulting in façade surface normal having a substantially zero elevation (e.g. y axis) value.

At block 910 the system identifies the surface normal for the roof facet. The system may select the surface normal which corresponds to a label or class associated with the roof facet. The output may also represent the surface normal in implementations in which the network outputs the surface normal for only the roof facet. As described herein, the system may compare the surface normal to a gravity vector or presumed gravity vector (e.g. a unit vector of [0,0,1]). The pitch of the roof facet may then be determined based on the angle formed by the surface normal and the gravity vector.

FIG. 10 illustrates a point cloud 1002 of a structure generated from an imaging device according to some embodiments. As may be appreciated, a point cloud may represent a three-dimensional representation of a structure. For example, each point within the point cloud may be assigned a three-dimensional coordinate. In some embodiments, the point cloud 1002 may be generated using a multitude of images obtained via a user device of a user. For example, the point cloud 1002 may be created using stereo cameras of the user device. As another example, the point cloud 1002 may be created based on images which are taken at different locations about the structure.

In some embodiments, a point cloud of the structure may be generated, such as in FIG. 11 using structure from motion, dense capture by LiDAR or other time of flight systems or other point cloud techniques such as described in U.S. patent application Ser. No. 14/339,127 which is hereby incorporated herein by reference in its entirety.

The point cloud 1002, as may be appreciated, includes points associated with a roof facet of the structure. For example, using a set of images of the structure a system or user device may assign depth information to points included in the set of images. In this example, a portion of these points may represent points associated with the roof facet. The system or user device may identify points which form, or otherwise associated with the roof facet using a machine learning model. For example, a neural network may be trained to label points of an input point cloud as forming part of a roof facet. In this example, certain points included in a point cloud may be labeled with, or otherwise associated with, respective roof facets of a structure. Thus, if a structure has multiple roof facets the neural network may be trained to output points which form each of the roof facets.

In addition to example automated techniques, such as described above, a user may identify roof facets included in the point cloud 1002. For example, the user may identify a boundary of a roof facet as illustrated in the point cloud 1002. Optionally, the system or user device may then filter, or otherwise adjust, the points which form the boundary of the roof facet. As an example, the system or user device may filter adjacent points which have greater than a threshold change in position (e.g., change in height). These points may represent artifacts generated during formation of the point cloud 1002. Additionally, these points may represent a wall or other portion of the structure.

To determine a surface normal for the roof facet, the system or user device may select a threshold number of points associated with the roof facet. An example threshold number of points may include three points, five points, eight points, and so on, and will be referred to as three points moving forward as one example. The surface normal may then be determined based on the three points. For example, two vectors may be formed from the three points, each vector connecting two of the three points. In this example, the surface normal may be determined based on a cross-product of the two vectors. As another example, a plane may be determined using the three points. The surface normal may then be determined for the plane.

In some embodiments, the system or user device may select the three points randomly from the points associated with the roof facet. The system or user device may also select three points which are within a threshold distance of each other. For example, the threshold distance may represent a distance along the roof facet (e.g., 4 inches, one meter, and so on). The system or user device may also allow for the user to zoom into the point cloud 1002 and to manually identify three points. As may be appreciated, a roof facet may include shingles or other elements which cause variations in height. Thus, the user may select points which form similar portions of the roof (e.g., a top of the shingle, a surface of the roof on which the shingle sits, and so on) via zooming into the point cloud 1002.

In addition to receipt of user input, the system or user device may select three points based on respective confidences associated with the points forming part of a same roof facet. For example, during generation of the point cloud 1002 the system or user device may output confidences for each point in the point cloud 1002. In this example, the system or user device may thus select three points associated with greater than a threshold confidence which are optionally within a threshold distance of each other. Furthermore, the system or user device may analyze a roof facet to identify shingles or other repeating variation in height of elements on the roof facet. As an example, the system or user device may determine translation vectors associated with the roof facet indicating positions of shingles (e.g., which may be analogous to a Bravais lattice). Thus, the system or user device may select three points which are determined to be at a same, or similar, portion of a shingle or other element on the roof facet. In this way, the three points may be used to define a plane which is representative of the pitch of the roof facet.

In some embodiments, the system or user device may select three points a multitude of times and therefore determine a corresponding multitude of surface normals. These surface normals may then be averaged, or otherwise combined, to determine a final surface normal for the roof facet. In some embodiments, certain outliers of the surface normals may be discarded. For example, surface normals greater than a threshold metric from a measure of central tendency of the surface normals, or remaining surface normals, may be discarded.

The system or user device may separate, or segment, the roof facet into a multitude of portions. For example, the roof facet may be separated into 4 portions (e.g., quadrants). In this example, the system or user device may select three points one or more times in each of the portions. The system or user device may then determine surface normals in each of the portions and may average, or otherwise combined, the surface normals.

FIG. 11 illustrates segmentation of roof facets in a point cloud 1002 according to some embodiments. As described in FIG. 10, three points in point cloud 1002 may be selected and a surface normal determined based on the three points. The illustrated example includes point cloud 1002 as being segmented to identify a surface 890 of the roof facet. As described above, segmentation may be performed using a neural network or other machine learning model. Optionally, a user may identify a boundary of the roof facet.

The system or user device may use the resulting segmented structure to select points (e.g., three points) which form part of the surface 890. In some embodiments, the point cloud 1002 may be presented to a user from a point of view of a virtual camera which is the same, or similar, to a point of view of a real-world camera which obtained an image used to generate the point cloud 1002. Thus, the user may view the image and select points which form the roof facet and the system or user device may translate these selections to the point cloud 1002. Thus, the system or user device may use these selected points in the point cloud 1002.

FIG. 12 illustrates an example flow chart of a process 1200 for determining a surface normal based on a point cloud. For convenience, the process 1200 will be described as being performed by a user device or system of one or more processors (hereinafter referred to as a system).

At block 1202, the system receives one or more images of a structure. The system may receive a multitude of images taken at different positions about the structure. The system may also receive one or more images taken by a user device with two or more cameras. These cameras may be used to inform depth information of locations depicted in the images.

At block 1204, the system generates a point cloud. As described in FIGS. 10-11, the system may generate, or obtain, a point cloud based in the images.

At block 1206, the system optionally segments the point cloud. The system may identify a roof facet, or multiple roof facets, using, for example, a machine learning model trained to segment points of the point cloud. The machine learning model may also be trained to characterize points in the point cloud as being associated with specific labels (e.g., roof facet, wall, and so on). Optionally, the machine learning model may use the point cloud and the received images as input. Optionally, the machine learning model may be trained to segment an underlying roof surface from elements on the roof surface (solar cells, decorative elements, and so on). As described in FIGS. 10-11, the system may respond to user input which is usable to segment the point cloud to identify, at least, the roof facet.

At block 1208, the system selects a threshold number of points associated with the roof facet. As described in FIGS.

10-11, the system selects points (e.g., three points, such as three points not on a same line) to determine a surface normal.

At block 1210, the system determines the surface normal based on the points. For example, and with respect to three points, the system may determine two vectors based on the points. In this example, the system may determine a cross-product of these two vectors to determine the surface normal. As another example, the system may determine a plane based on the three points and compute a surface normal to the plane.

Using the surface normal and a gravity vector (e.g., as described herein) the system may determine a pitch of the roof facet.

Figure 13:
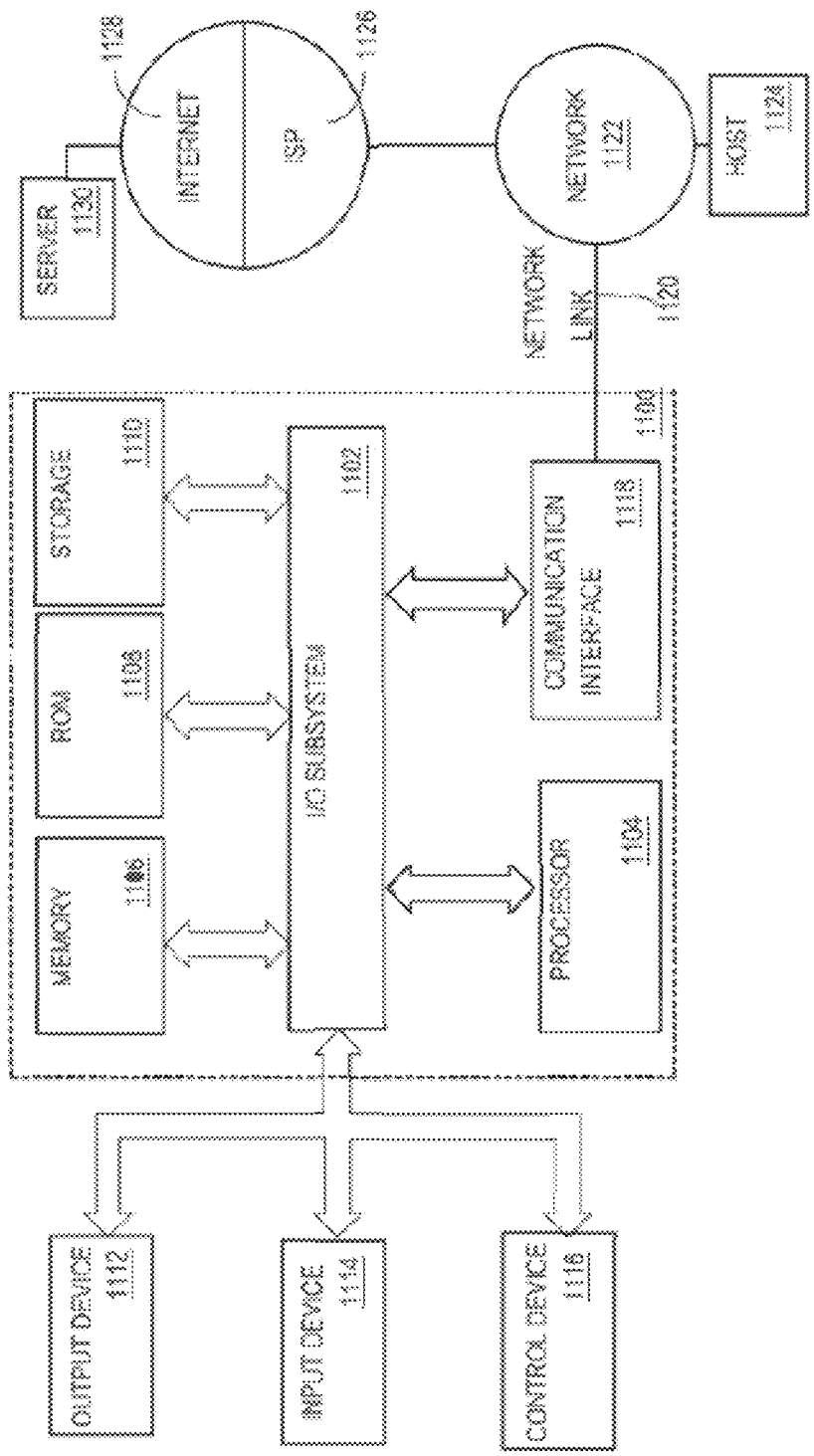
FIG. 13 is a block diagram illustrating a computer system that may be used to implement the techniques described herein according to some embodiments.

FIG. 13 illustrates a computer system 1300 configured to perform any of the steps described herein. Computer system 1300 includes a I/O Subsystem 1302 or other communication mechanism for communicating information, and a hardware processor, or multiple processors, 1304 coupled with I/O Subsystem 1302 for processing information. Hardware processor(s) 1304 may be, for example, one or more general purpose microprocessors.

Computer system 1300 also includes a main memory 1306, such as a random access memory (RAM), cache and/or other dynamic storage devices, coupled to I/O Subsystem 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

Computer system 1300 further includes a read only memory (ROM) 1308 or other static storage device coupled to I/O Subsystem 1302 for storing static information and instructions for processor 1304. A storage device 1310, such as a magnetic disk, optical disk, or USB thumb drive (Flash drive), etc., is provided and coupled to I/O Subsystem 1302 for storing information and instructions.

Computer system 1300 may be coupled via I/O Subsystem 1302 to an output device 1312, such as a cathode ray tube (CRT) or LCD display (or touch screen), for displaying information to a computer user. An input device 1314, including alphanumeric and other keys, is coupled to I/O Subsystem 1302 for communicating information and command selections to processor 1304. Another type of user input device is control device 1316, such as a mouse, a trackball, or cursor direction keys for communicating direction information and command selections to processor 1304 and for controlling cursor movement on output device 1312. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1300 may include a user interface module to implement a GUI that may be stored in a mass storage device as computer executable program instructions that are executed by the computing device(s). Computer system 1300 may further, as described below, implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor(s) 1304 executing one or more sequences of one or more computer readable program instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1304 for execution. For example, the instructions may initially be carried on a magnetic disk or solid state drive of a remote computer. The remote computer can load the instructions into its dynamic memory and send the instructions over a telephone line, cable, using a modem (or optical network unit with respect to fiber). A modem local to computer system 1300 can receive the data on the telephone line and use an infra-red transmitter to convert the data to an infra-red signal. An infra-red detector can receive the data carried in the infra-red signal and appropriate circuitry can place the data on I/O Subsystem 1302. I/O Subsystem 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to I/O Subsystem 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or WAN component to communicated with a WAN). Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

Additional Embodiments

Though particular reference is made in this disclosure to using surface normals for pitch determination, additional use cases for surface normal extraction are also realized. In some embodiments, a render camera's optical axis is positioned to be parallel with an opposite orientation to a surface normal of a particular planar surface. In such embodiments, after a surface normal for a particular surface is determined, a 3D model comprising that surface is displayed, with the displayed image having the surface normal vector pointing towards and parallel to the optical axis of a displays' render camera. In effect, this will present the planar surface in a way that the surface orientation of the planar surface is parallel to the image plane of the display. Navigation in three or more dimensions is difficult to manipulate, especially given the two dimensional tools of common computing (2D displays, computer mouse moving over a 2D surface, etc.). Snapping the displayed image of a particular plane's surface normal to a display's render camera's optical axis alleviates fine tuning of three dimensional navigation in a 2D display. Similarly, rotating planar surfaces, or the three dimensional object a surface is attached to, about an identified surface normal for that planar surface constrains at least one degree of freedom in moving an object in three dimensional space and streamlines navigation, planar rectification and display of select surfaces.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method implemented by a system of one or more computers, the method comprising:
   obtaining an image depicting a structure, the image being captured via a user device positioned proximate to the structure;
   segmenting the image to identify, at least, an eave vector and a rake vector which are associated with a roof facet of the structure;
   adjusting the eave vector and rake vector with a mutual transform to produce a perpendicular angle between the eave vector and rake vector;
   calculating a cross product vector based on the transformed eave vector and the rake vector; and
   extracting a normal vector of the roof facet based on an inverse of the mutual transform being applied to the cross product vector.

2. The method of claim 1, wherein a pitch associated with the roof facet is determined based on the normal vector and a gravity vector indicative of a vertical direction.

3. The method of claim 2, wherein the gravity vector is indicative of the vertical direction based on information associated with the image, the information reflecting an orientation of the user device during capture of the image.

4. The method of claim 2, wherein the gravity vector is indicative of the vertical direction based on information associated with the image, the information being determined based on augmented reality information derived by the user device.

5. The method of claim 4, wherein the gravity vector is indicative of the vertical direction defined according to a vanishing point coordinate system associated with the structure.

6. The method of claim 5, wherein determining the vanishing point coordinate system comprises:
   identifying a plurality lines of the structure;
   identifying one or more points where at least two lines of the plurality of lines intersect; and
   generating the vanishing point coordinate system based on the one or more points.

7. The method of claim 1, wherein segmenting the image is based on application of a machine learning model.

8. The method of claim 7, wherein the machine learning model is a neural network, and wherein segmenting the image comprises computing a forward pass of the image with respect to the neural network.

9. The method of claim 1, wherein segmenting the image is based on user input provided via a user.

10. The method of claim 9, wherein the user input is provided to an interactive user interface, and wherein the interactive user interface:
    receives user input representing a line on the image, wherein the system is configured to assign points in the image as corresponding to the eave vector or rake vector based on the user input; and
    update to graphically represent the eave vector or rake vector.

11. The method of claim 1, wherein the image was captured below a maximum height of the structure.

12. The method of claim 1, wherein the system is configured to determine a plurality of surface normals corresponding to a plurality of roof facets.

13. A system comprising:
   one or more processors; and
   non-transitory computer-readable media storing instructions which, when executed by the one or more processors, cause the one or more processors to:
      obtain an image depicting a structure, the image being captured via a user device positioned proximate to the structure;
      segment the image to identify, at least, an eave vector and a rake vector which are associated with a roof facet of the structure;
      adjust the eave vector and rake vector with a mutual transform to produce a perpendicular angle between the eave vector and rake vector;
      calculate a cross product vector based on the transformed eave vector and the rake vector; and
      extract a normal vector of the roof facet based on an inverse of the mutual transform being applied to the cross product vector.

14. The system of claim 13, wherein a pitch associated with the roof facet is determined based on the normal vector and a gravity vector indicative of a vertical direction.

15. The system of claim 14, wherein the gravity vector is indicative of the vertical direction based on information associated with the image, the information reflecting an orientation of the user device during capture of the image.

16. The system of claim 14, wherein the gravity vector is indicative of the vertical direction based on information associated with the image, the information being determined based on augmented reality information derived by the user device.

17. The system of claim 16, wherein the instructions further cause the one or more processors to:
    identify a plurality lines of the structure;
    identify one or more points where at least two lines of the plurality of lines intersect; and
    generate a vanishing point coordinate system based on the one or more points, the vanishing point coordinate system associated with the structure;
    wherein the vertical direction is defined according to the vanishing point coordinate system.

18. The system of claim 13, wherein to segment the image the instructions cause the one or more processors to compute a forward pass of the image with respect to a neural network.

19. The system of claim 13, wherein to segment the image the instructions cause the one or more processors to segment the image based on user input provided via a user; and
    wherein the instructions further cause the one or more processors to provide the user input to an interactive user interface, the interactive user interface configured to:
       receive user input representing a line on the image, wherein the instructions cause the one or more processors to assign points in the image as corresponding to the eave vector or rake vector based on the user input; and
       update to graphically represent the eave vector or rake vector.

20. A non-transitory computer storage media storing instructions that when executed by a system of one or more processors, cause the one or more processors to perform operations comprising:
    obtaining an image depicting a structure, the image being captured via a user device positioned proximate to the structure;

segmenting the image to identify, at least, an eave vector and a rake vector which are associated with a roof facet of the structure;

adjusting the eave vector and rake vector with a mutual transform to produce a perpendicular angle between the eave vector and rake vector;

calculating a cross product vector based on the transformed eave vector and the rake vector; and extracting a normal vector of the roof facet based on an inverse of the mutual transform being applied to the cross product vector.

21. The non-transitory computer storage media of claim 20, wherein a pitch associated with the roof facet is determined based on the normal vector and a gravity vector indicative of a vertical direction.

22. The non-transitory computer storage media of claim 21, wherein the gravity vector is indicative of the vertical direction based on information associated with the image, the information reflecting an orientation of the user device during capture of the image.

23. The non-transitory computer storage media of claim 21, wherein the gravity vector is indicative of the vertical direction based on information associated with the image, the information being determined based on augmented reality information derived by the user device.

24. The non-transitory computer storage media of claim 23, wherein the gravity vector is indicative of the vertical direction defined according to a vanishing point coordinate system associated with the structure.

25. The non-transitory computer storage media of claim 24, wherein determining the vanishing point coordinate system comprises:

identifying a plurality lines of the structure;

identifying one or more points where at least two lines of the plurality of lines intersect; and generating the vanishing point coordinate system based on the one or more points.

26. The non-transitory computer storage media of claim 20, wherein segmenting the image is based on application of a machine learning model.

27. The non-transitory computer storage media of claim 26, wherein the machine learning model is a neural network, and wherein segmenting the image comprises computing a forward pass of the image with respect to the neural network.

28. The non-transitory computer storage media of claim 20, wherein segmenting the image is based on user input provided via a user.

29. The non-transitory computer storage media of claim 28, wherein the user input is provided to an interactive user interface, and wherein the interactive user interface:

receives user input representing a line on the image, wherein the system is configured to assign points in the image as corresponding to the eave vector or rake vector based on the user input; and update to graphically represent the eave vector or rake vector.

30. The non-transitory computer storage media of claim 20, wherein the image was captured below a maximum height of the structure.

31. The non-transitory computer storage media of claim 20, wherein the system is configured to determine a plurality of surface normals corresponding to a plurality of roof facets.

* * * * *

UNITED STATES PATENT AND TRADEMARK OFFICE
CERTIFICATE OF CORRECTION

| | | |
|---|---|---|
| PATENT NO. | : 12,182,936 B2 | Page 1 of 1 |
| APPLICATION NO. | : 18/505997 | |
| DATED | : December 31, 2024 | |
| INVENTOR(S) | : William Castillo et al. | |

It is certified that error appears in the above-identified patent and that said Letters Patent is hereby corrected as shown below:

In the Specification

In Column 1, Lines 6-7, delete "is the continuation a divisional of" and insert --is a divisional of--.

In the Claims

In Column 23, Claim 6, Line 41, delete "plurality lines" and insert --plurality of lines--.

In Column 24, Claim 17, Line 36, delete "plurality lines" and insert --plurality of lines--.

In Column 25, Claim 25, Line 33, delete "plurality lines" and insert --plurality of lines--.

Signed and Sealed this
Fourteenth Day of October, 2025

John A. Squires
*Director of the United States Patent and Trademark Office*